US011349539B2

United States Patent
Orhan et al.

(10) Patent No.: US 11,349,539 B2
(45) Date of Patent: May 31, 2022

(54) SPATIAL THERMAL DENSITY REDUCTION FOR MMWAVE ANTENNA ARRAYS

(71) Applicant: Apple Inc., Cupertino, CA (US)

(72) Inventors: Oner Orhan, San Jose, CA (US);
Brent Elliott, Hillsboro, OR (US);
Hosein Nikopour, San Jose, CA (US);
Eren Sasoglu, Mountain View, CA (US); Shilpa Talwar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/052,678

(22) PCT Filed: Jun. 29, 2018

(86) PCT No.: PCT/US2018/040441
§ 371 (c)(1),
(2) Date: Nov. 3, 2020

(87) PCT Pub. No.: WO2020/005294
PCT Pub. Date: Jan. 2, 2020

(65) Prior Publication Data
US 2021/0242915 A1    Aug. 5, 2021

(51) Int. Cl.
*H04B 7/06*       (2006.01)
*H04B 1/44*       (2006.01)
*H04B 7/0456*     (2017.01)

(52) U.S. Cl.
CPC .............. *H04B 7/0608* (2013.01); *H04B 1/44* (2013.01); *H04B 7/0456* (2013.01); *H04B 7/0617* (2013.01)

(58) Field of Classification Search
CPC ....... H04L 2025/043426; H04L 25/067; H04L 1/0054; H04L 27/38; H04L 25/0204
(Continued)

(56) References Cited

U.S. PATENT DOCUMENTS 6,140,976 A    10/2000    Lock et al.
8,620,235 B2   12/2013    Riddle et al.
(Continued)

FOREIGN PATENT DOCUMENTS

WO    2018074955 A1    4/2018
WO    2018119153 A3    6/2018

OTHER PUBLICATIONS

International Search Report and Written Opinion for International Application No. PCT/US2018/040441, dated Mar. 25, 2019, 12 pgs.
(Continued)

*Primary Examiner* — Shuwang Liu
*Assistant Examiner* — Gina M McKie
(74) *Attorney, Agent, or Firm* — Kowert, Hood, Munyon, Rankin & Goetzel, P.C.

(57) ABSTRACT

An apparatus, method and computer readable medium for special thermal density reduction by antenna thinning. A system comprises N transmit/receive (TX/RX) chains, where each TX/RX chain comprises an RFFE and each RFFE comprises one or more thermal sensors configured to measure heat in the RFFE. An antenna array coupled to the plurality of TX/RX chains. A codebook that comprises a plurality of code words configured to respond to real-time heat measurements from the thermal sensors in each TX/RX chain is configured to switch off selected TX/RX chains to reduce thermal density at the antenna array while maintaining M RFFEs switched on, where M<N and the desired beamforming gain is 10 log 10(M).

20 Claims, 18 Drawing Sheets

(58) Field of Classification Search
USPC .......................................................... 375/262
See application file for complete search history.

(56) References Cited

U.S. PATENT DOCUMENTS

| | | | |
|---|---|---|---|
| 2013/0260702 A1* | 10/2013 | Kenington | H04B 1/04 455/127.2 |
| 2017/0104610 A1* | 4/2017 | Lopez | H04L 25/0204 |
| 2018/0076518 A1 | 3/2018 | Bonebright et al. | |
| 2020/0304158 A1* | 9/2020 | Lu | H04B 1/0475 |

OTHER PUBLICATIONS

Zhenyu Xiao et al., 'Codebook Design for Millimeter-Wave Channel Estimation 1-16,19-26 with Hybrid Precoding Structure', IEEE Transactions on Wireless Communications, vol. 16, No. 1, Jan. 2017, pp. 141-153.

Zhenyu Xiao et al:"Codebook Design for Millimeter-Wave Channel Estimation With Hybrid Precoding Structure" IEEE Transactions on Wireless Communications. vol. 16, No. 1. Jan. 1, 2017. 13 pages.

Xiao Zhenyu et al: "Hierarchical Codebook Design for Beamforming Training in Millimeter-Wave Communication", IEEE Transactions Wireless Communications, IEEE Service Center, Piscataway, NJ, US. vol. 15, No. 5. May 1, 2016. 13 Pages.

\* cited by examiner

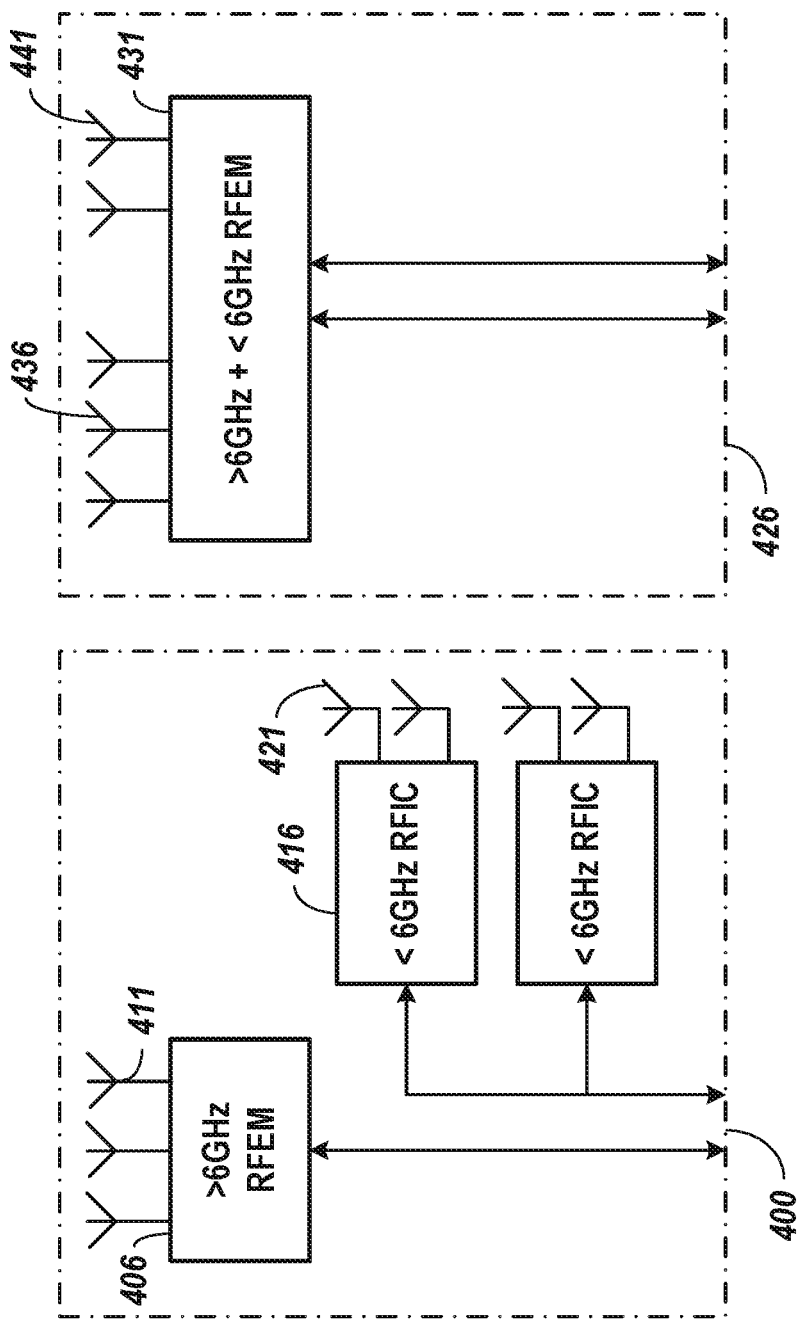

SPATIAL THERMAL DENSITY REDUCTION FOR MMWAVE ANTENNA ARRAYS

This application is a U.S. National Stage filing of International Application No. PCT/US2018/040441, filed Jun. 29, 2018, titled "Spatial Thermal Density Reduction for MMWAVE Antenna Arrays", which is incorporated herein by reference in its entirety.

TECHNICAL FIELD

Some aspects of the present disclosure pertain to thermal management of RF-front end components in wireless communication systems operating at millimeter wave (mm-Wave) in frequencies.

BACKGROUND

The fifth generation (5G) or fifth generation plus (5G+) is envisioned to support enhanced vehicle to everything (V2X) systems. V2X systems require vehicle platooning advanced driving (e.g., fully automated driving), extended sensors, and remote driving. In addition, drones are becoming one of the emerging technologies for remote operation, real time sensing and reporting (e.g., video delivery). All these applications may need high data rates, low latency, and high reliability. For example, vehicle platooning may need periodic data exchange between cars for platooning operations, which requires less than 3 millisecond (ms) end-to-end latency for cooperation and coordination. For advanced and remote driving each vehicle may need data, from sensors, of their nearby vehicles for coordination to enable safer travelling collision avoidance, and improved traffic efficiency. In addition, to enhance perception of environment, the exchange of raw data from local cameras, light detection and radar (LIDAR), other radars, road side units and servers are needed. Therefore, high data rates with very low latency and high reliability may be needed for autonomous vehicles and drones. As examples, extended sensors and remote driving requires 99.99% and 99.999% reliability, respectively, and sensor information sharing between vehicles supporting V2X application is believed to require 1 gigabit-per-second (Gbps) data rate. Similarly, drones require very low latency for coordinating with other drones. For the above applications, communication systems which can support the strict requirements given above are needed.

There are some standard developments for the system applications requirements discussed above. These include dedicated short range communications (DSRC). However, DSRC can provide data rates up to 27 megabits-per-second (Mbps). Further, the 6 GHz bands (e.g., long term evolution (LTE) and other current systems) are already congested and have limited data capacity. As a solution, then, the large spectrum of millimeter bands can be considered for high data rate communications. In addition, mmWave beamforming provides inherent increased location accuracy, inherent physical layer security, and extended coverage. However, high frequency operation at mmWave frequencies will generate considerable excessive heat energy due to operation of the circuitry of the radio frequency front end (RFFE). Because power efficiency of RF components decreases as heat energy increases, a critical issue with mmWave systems is thermal management of RF-front end components. Hence improved thermal management at mmWave frequencies is needed.

BRIEF DESCRIPTION OF THE DRAWINGS

FIG. 4A illustrates a radio front end circuitry (RFEM), according to some aspects of the present disclosure.

FIG. 4B illustrates another RFEM, according to some aspects of the present disclosure.

DETAILED DESCRIPTION

The following description and the drawings sufficiently illustrate specific aspects of the present disclosure to enable those skilled in the art to practice them. Other aspects may incorporate structural, logical, electrical, process, and other changes. Portions and features of some aspects of the present disclosure may be included in, or substituted for, those of other aspects. Aspects of the disclosure set forth in the claims encompass all available equivalents of those claims.

The millimeter wave frequency range, where the disclosed systems are scheduled to operate, is formally defined as a frequency range spanning about GHz to about 300 GHz, and in practice currently covers several discrete licensed and unlicensed frequency bands.

Figure 1:
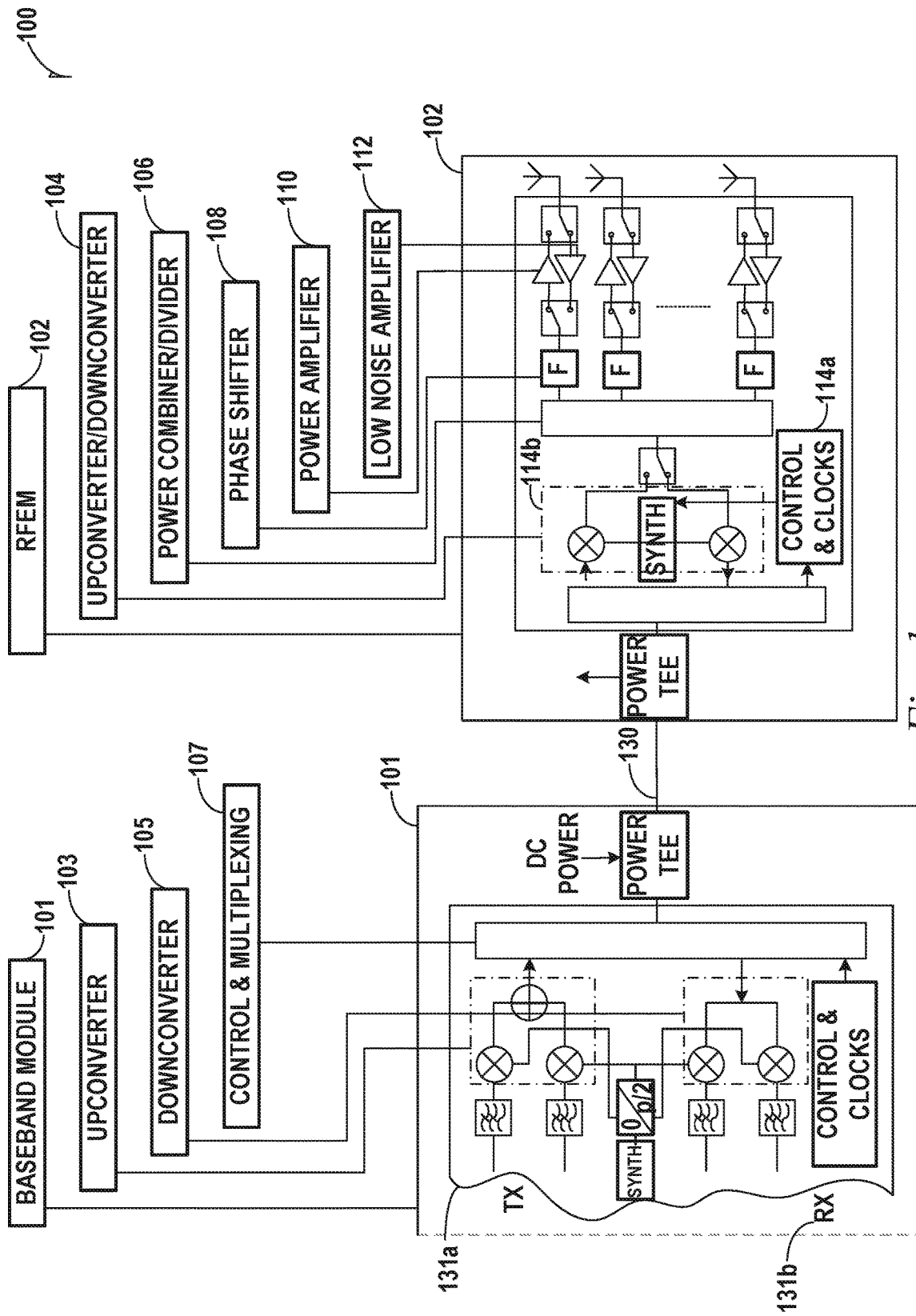
FIG. 1 illustrates a mmWave system, according to some aspects of the present disclosure.

The only unlicensed mmWave frequency band currently available is in the vicinity of 60 GHz. Licensed frequency bands are likely to include 28 GHz, 39 GHz, 73 GHz and 120 GHz. The availability of these bands and the specific frequency range of each varies by regulatory jurisdiction, and in some cases (specifically for licensed band operation) there is still significant uncertainty as to regulations in some countries. Challenges associated with mmWave-based cellular communications include limited range, directionality of antennas of the rang, signal loss because of use of regular cables instead of traces, and challenges with integrating multiple antennas for beamforming. These challenges are addressed as discussed below, and may include use of polarization innovations, trace and other line use to avoid signal loss, and an improved ability for use in beamforming FIG. 1 illustrates an mmWave system 100. The system includes two components: a baseband circuitry 101 and one or more RFEMs 102. The RFEM is connected to the baseband circuitry by a single coaxial cable 130, which supplies a modulated intermediate frequency (IF) signal, DC power, clocking signals and control signals. Applications of mmWave technology can include, for example, WiGig and future 5G, but the mmWave technology can be applicable to a variety of telecommunications systems. The mmWave technology can be especially attractive for short-rang telecommunications systems. WiGig devices operate in the unlicensed 60 GHz band, whereas 5G mmWave is expected to operate initially in the licensed 28 GHz and 39 GHz bands. A block diagram of the baseband 101 and RFEM 102 in an mmWave system is shown in FIG. 1. The baseband 101 is not shown in its entirety, but rather shows an implementation of analog front end. This includes a transmitter (TX) 131a section with an upconverter 103 to intermediate frequency (IF) (around 10 GHz in current implementations), a receiver (RX) section 131b with downconversion 105 from IF to baseband, control and multiplexing circuitry including a combiner to multiplex/demultiplex transmit and receive signals onto a single cable 130. In addition, power tee circuitry 109 (which includes discrete components) is included on the baseband circuit board to provide DC power for the RFEM 102. In some aspects of the present disclosure, the combination of the TX section and RX section may be referred to as a transceiver to which may be coupled one or more antennas or antenna arrays of the type described herein.

The RFEM 102 can be a small circuit board including a number of printed antennas and one or more RF devices containing multiple radio chains, including upconversion/downconversion 104 to millimeter wave frequencies, power combiner/divider 106, programmable phase shifting 108 and power amplifiers (PA) 110, low noise amplifiers (LNA) 112, as well as control and power management circuitry 114a, 114b. This arrangement can be different from Wi-Fi or cellular implementations, which generally have all RF and baseband functionality integrated into a single unit and only antennas connected remotely via coaxial cables.

This architectural difference is driven by the very large power losses in coaxial cables at millimeter wave frequencies. These power losses would both reduce the transmit power at the antenna and reduce receive sensitivity. In order to avoid this issue, PA 110 and LNA 112 may be moved to an RFEM 102 with integrated antennas. In addition, the RFEM 102 may include upconversion/downconversion circuitry 104 so that the IF signals over the coaxial cable 130 can be at a lower frequency. The system context for mmWave 5G is discussed below.

Figure 2:
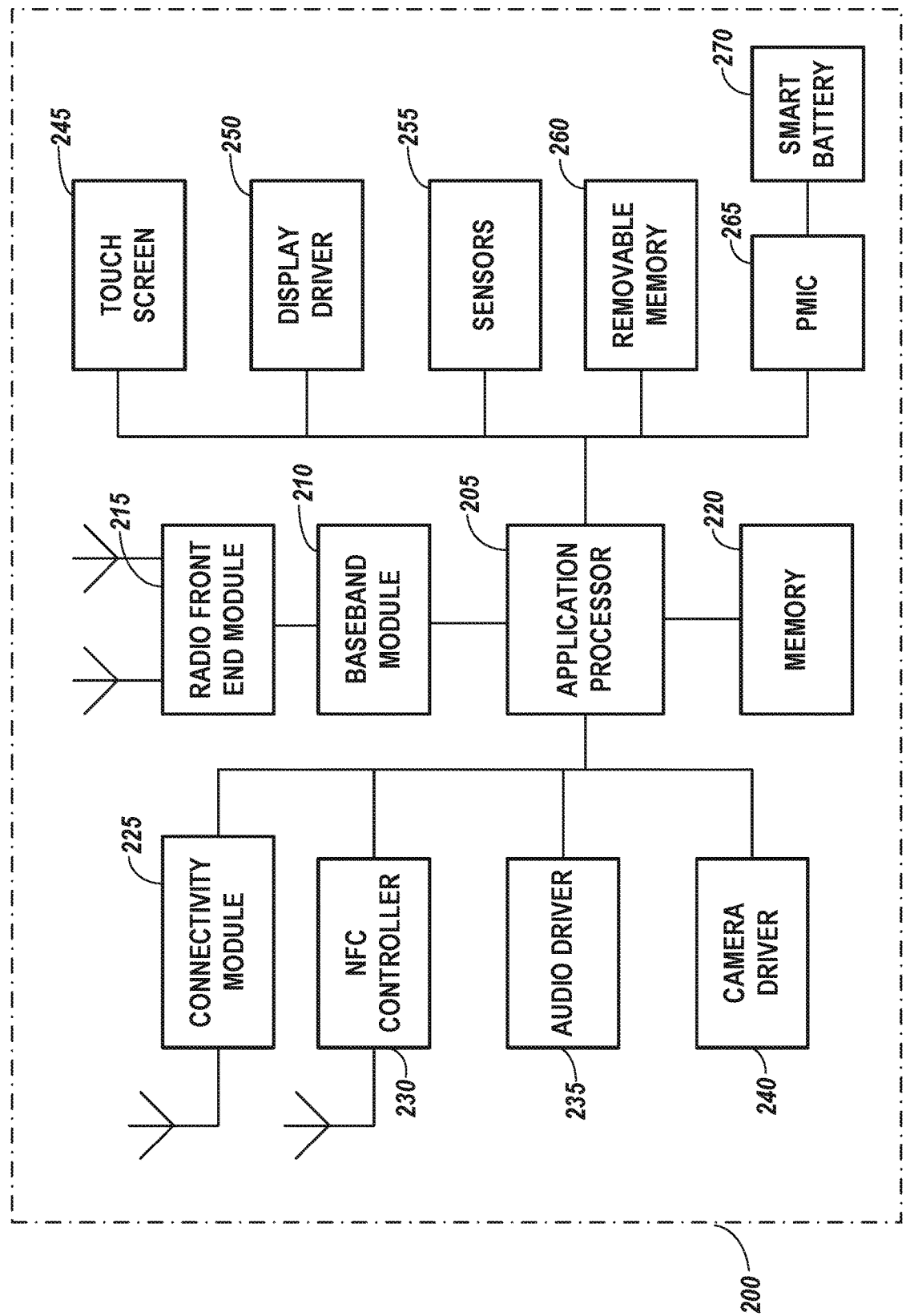
FIG. 2 illustrates a user device, according to some aspects of the present disclosure.

FIG. 2 illustrates a user device 200, according to some aspects of the present disclosure. The user device may be a mobile device in some aspect and, in some aspects of the present disclosure may be user equipment (UE) as that term is used in the 3rd Generation Partnership Project (3GPP) and other communication systems. The user device 200 includes an application processor 205, baseband circuitry 210, radio front end module (RFEM) 215, memory 220, connectivity circuitry 225, NFC controller 230, audio driver 235, camera driver 240, touch screen 245, display driver 250, sensors 255, removable memory 260, power management integrated circuit (PMIC) 265, and smart battery 270.

In some aspects of the present disclosure, application processer 205 may include one or more CPU cores and one or more of cache memory, low drop-out voltage regulators (LDOs), interrupt controllers, serial interfaces such as SPI, I2C or universal programmable serial interface circuitry, real time clock (RTC), timer-counters including interval and watchdog timers, general purpose IO, memory card controllers such as SD/MMC or similar, USB interfaces, MIPI interfaces and Joint Test Access Group (JTAG) test access ports.

Figure 3:
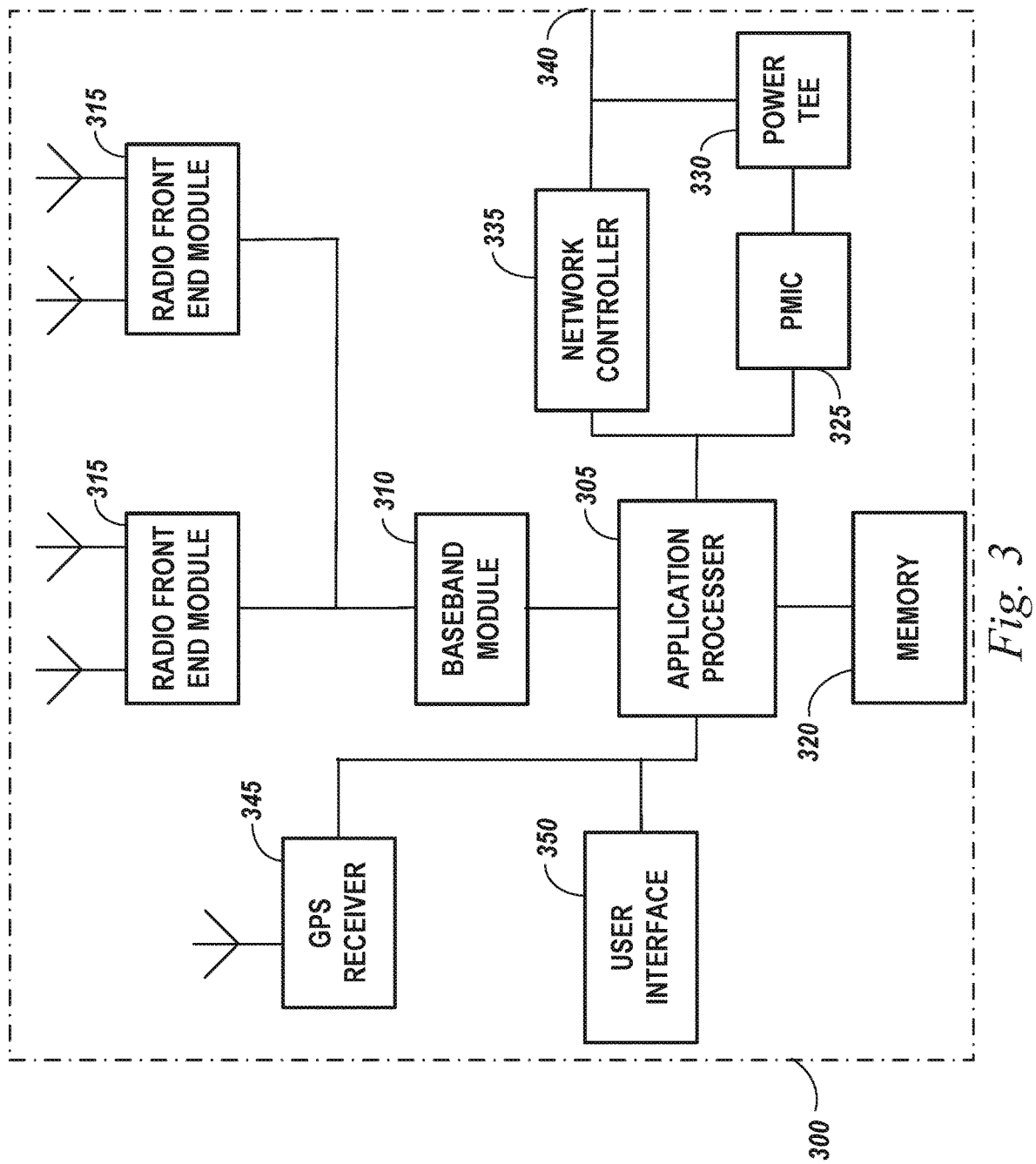
FIG. 3 illustrates a base station radio head, according to some aspects of the present disclosure.

In some aspects of the present disclosure, baseband circuitry 210 may be implemented, for example, as a solder-down substrate including one or more integrated circuits, a single packaged integrated circuit soldered to a main circuit board or a multi-chip module containing two or more integrated circuits FIG. 3 illustrates a base station radio head 300, according to some aspects of the present disclosure. The base station radio head 300 may include one or more of application processor 305, baseband circuitry 310, one or more radio front end modules 315, memory 320, power management circuitry 325, power tee circuitry 330, network controller 335, network interface connector 340, satellite navigation receiver circuitry 345, and user interface 350.

In some aspects of the present disclosure, application processor 305 may include one or more CPU cores and one or more of cache memory, low drop-out voltage regulators (LDOs), interrupt controllers, serial interfaces such as SPI, I2C or universal programmable serial interface circuitry, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects of the present disclosure, baseband circuitry 310 may be implemented, for example, as a solder-down substrate including one or more integrated circuits, a single packaged integrated circuit soldered to a main circuit board or a multi-chip module containing two or more integrated circuits.

In some aspects of the present disclosure, memory 320 may include one or more of volatile memory, including dynamic random access memory (DRAM) and/or synchronous DRAM (SDRAM), and nonvolatile memory (NVM), including high-speed electrically erasable memory (commonly referred to as Flash memory), phase-change random access memory (PRAM), magneto-resistive random access memory (MRAM), and/or a three-dimensional crosspoint memory. Memory 320 may be implemented as one or more of solder down packaged integrated circuits, socketed memory circuitry and plug-in memory cards.

In some aspects of the present disclosure, power management circuitry 325 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects of the present disclosure, power tee circuitry 330 may provide for electrical power drawn from a network cable to provide both power supply and data connectivity to the base station radio head 300 using a single cable.

In some aspects of the present disclosure, network interface circuitry 335 may provide connectivity to a network using a standard network interface protocol such as Ethernet. Network connectivity may be provided using a physical connection which is one of electrical (commonly referred to as copper interconnect), optical or wireless.

In some aspects of the present disclosure, satellite navigation receiver circuitry 345 may include circuitry to receive and decode signals transmitted by one or more navigation satellite constellations such as the global positioning system (GPS), Globalnaya Navigtsionnaya Sputnikovaya Sistema (GLONASS), Galileo and/or BeiDou. The receiver 345 may provide data to application processor 305 which may include one or more of position data or time data. Time data may be used by application processor 305 to synchronize operations with other radio base stations.

In some aspects of the present disclosure, user interface 350 may include one or more of buttons, such as a reset button, one or more indicators such as LEDs and a display screen.

FIG. 4A and FIG. 4B illustrate a radio front end module (RFEM), according to some aspects of the present disclosure.

FIG. 4A illustrates an aspect of a radio front end module 400 incorporating millimeter wave radio front end module (RFEM) 406 and one or more sub-six gigahertz RFIC 416. In this aspect, the one or more sub-six gigahertz RFICs 416 may be physically separated from millimeter wave RFEM 406. In some aspects of the present disclosure RFEM 406 and one or more RFICs 416 may be in the same component. RFICs 416 may include connection to one or more antennas 421. RFEM 406 may include multiple antennas 411.

FIG. 4B illustrates an alternate aspect of a radio front end module 426. In this aspect both millimeter wave and sub-six gigahertz radio functions may be implemented in the same physical radio front end module 431. RFEM 431 may incorporate both millimeter wave antennas 436 and sub-six gigahertz antennas 441.

Figure 5:
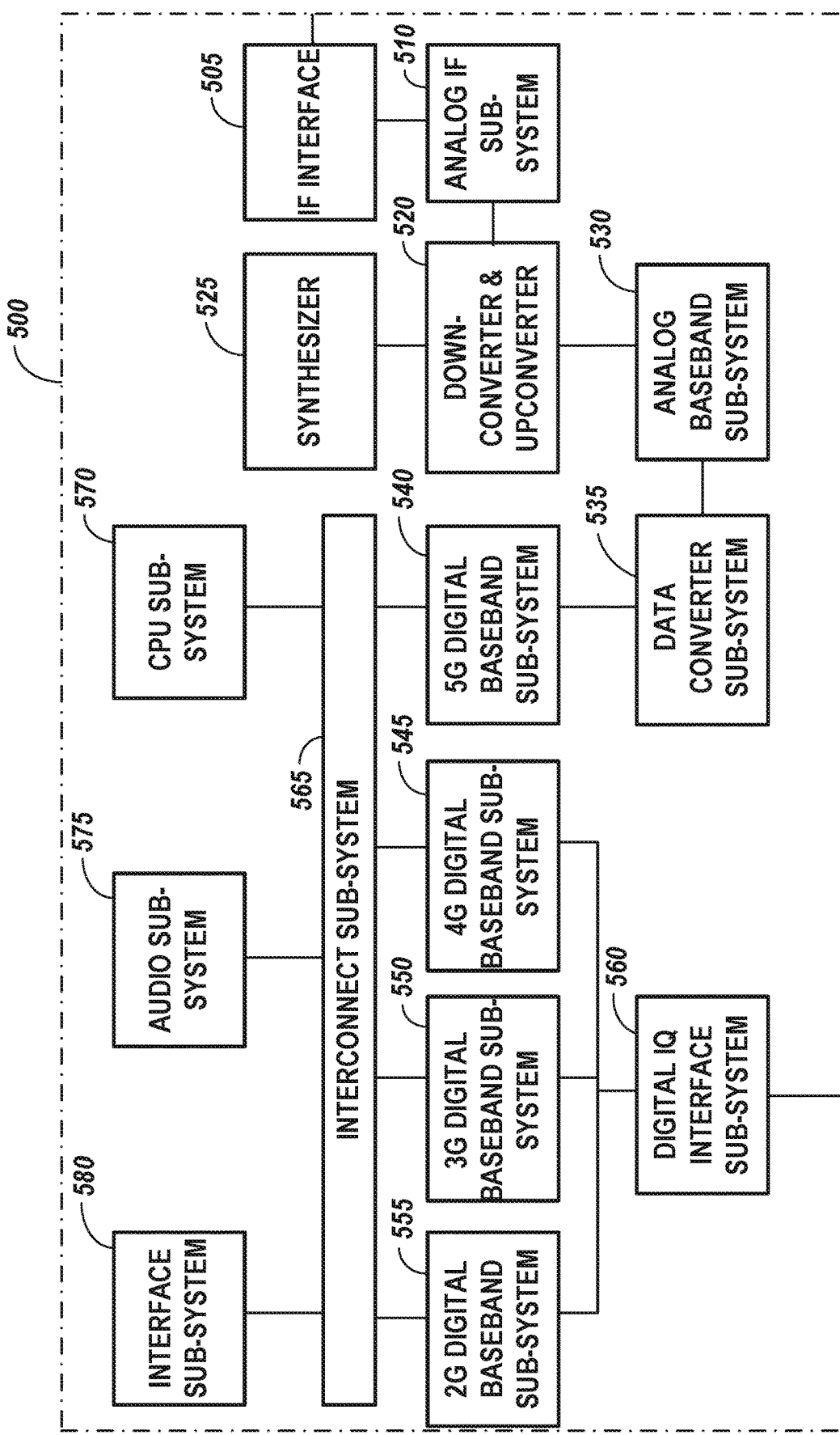
FIG. 5 illustrates a multi-protocol baseband processor, according to some aspects of the present disclosure.

FIG. 5 illustrates a multi-protocol baseband processor 500, according to some aspects of the present disclosure.

Baseband processor 500 may include one or more of IF interface 505, analog IF subsystem 510, downconverter and upconverter subsystem 520, frequency synthesizer 525, analog baseband subsystem 530, data converter subsystem 535 and 5G digital baseband 540. Baseband processor 500 may also include one or more of 4G digital baseband subsystem 545, 3G digital baseband subsystem 550, 2G digital baseband subsystem 555 and digital IQ interface subsystem 560.

In some aspects of the present disclosure, digital baseband subsystems which may include one or more of 540, 545, 550 and 555 may be coupled via interconnect subsystem 565 to one or more of CPU subsystem 570, audio subsystem 575 and interface subsystem 580. Interconnect subsystem 565 may include one or more buses and/or one or more network-on-chip (NOC) structures.

Figure 4C:
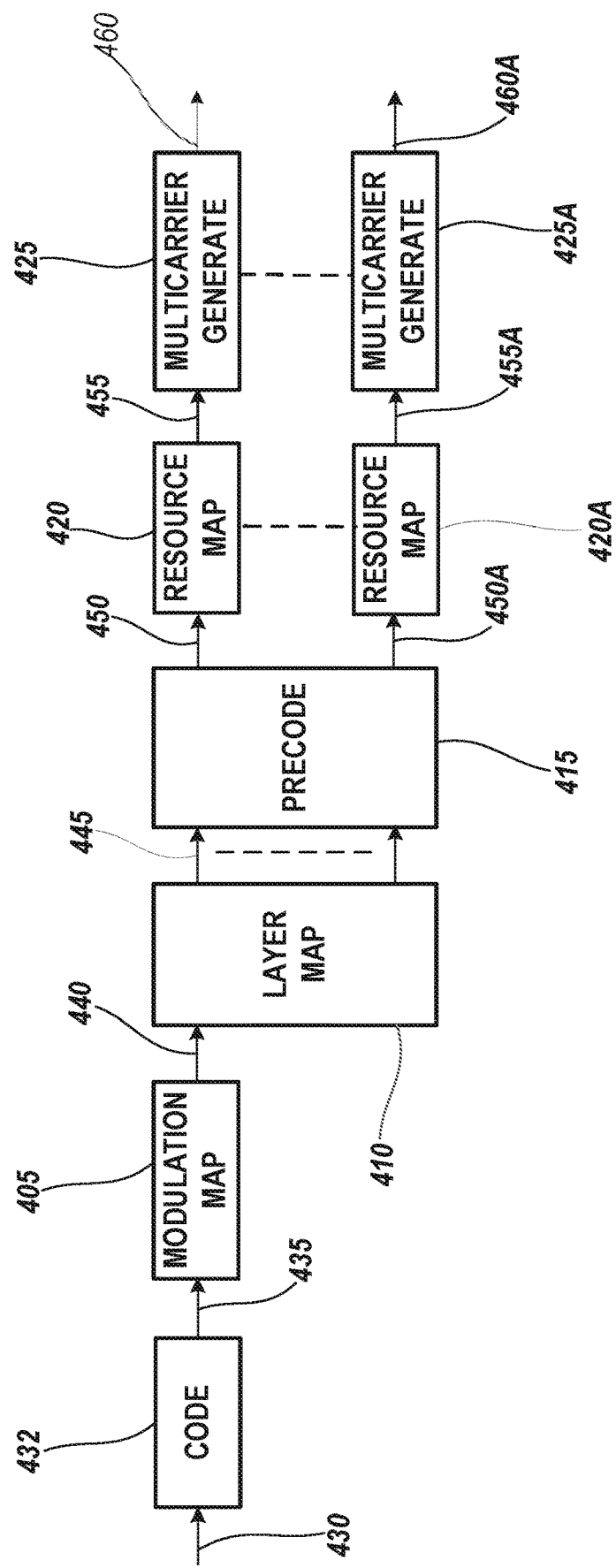
FIG. 4C illustrates an example of a system for generating multicarrier baseband signals for transmission, according to some aspects of the present disclosure

FIG. 4C illustrates an example of a system for generating multicarrier baseband signals for transmission according to some aspects of the present disclosure. In an aspect, data 430 may be input to an encoder 432 to generate encoded data 435. Encoder 432 may include a combination of one or more of error detecting error correcting rate matching and interleaving Encoder 432 may further include a step of scrambling. In an aspect, encoded data 435 may be input to a modulation mapper 405 to generate complex valued modulation symbols 440. Modulation mapper may map groups containing one or more binary digits, selected from encoded data 435, to complex valued modulation symbols according to one or more mapping tables.

In an aspect, complex-valued modulation symbols 440 may be input to layer mapper 410 to be mapped to one or more layer mapped modulation symbol streams 445. Representing a stream of modulation symbols 440 as d(i) where i represents a sequence number index, and the one or more streams of layer mapped symbols as x(k)(i) where k represents a stream number index and i represents a sequence number index, the layer mapping function for a single layer may be expressed as:

$$x^{(0)}(i)=d(i) \quad (1)$$

and the layer mapping for two layers may be expressed as:

$$x^{(0)}(i)=d(2i) \quad (2)$$

$$x^{(1)}(i)=d(2i+1) \quad (3)$$

Layer mapping may be similarly represented for more than two layers.

In an aspect, one or more streams of layer mapped symbols 445 may be input to precoder 415, which generates one or more streams of precoded symbols 450. Representing the one or more streams of layer mapped symbols as a block of vectors:

$$[x^{(0)}(i) \ldots x^{(v-1)}(i)]^T \quad (4)$$

where i represents a sequence number index in the range 0 to $M_{symb}^{layer}-1$ the output is represented as a block of vectors:

$$[z^{(0)}(i) \ldots z^{(P-1)}(i)]^T \quad (5)$$

where i represents a sequence number index in the range 0 to $M_{symb}^{ap}-1$. The precoding operation may be configured to include one of direct mapping using a single antenna port, transmit diversity using space-time block coding or spatial multiplexing In an aspect, each stream of precoded symbols 450/450A may be input to a resource mapper 420/420A, which generates a stream of resource mapped symbols 455/455A. The resource mapper 450/450A may map precoded symbols to frequency domain subcarriers and time domain symbols according to a mapping which may include contiguous block mapping randomized mapping or sparse mapping according to a mapping code.

In an aspect, the resource mapped symbols 455/455A may be input to multicarrier generator 425/425A, which generates time domain baseband symbol 460/460A. Multicarrier generator may generate time domain symbols using for example, an inverse discrete Fourier transform (DFT), commonly implemented as an inverse fast Fourier transform (FFT) or a filter bank comprising one or more filters.

In an aspect, where resource mapped symbols 455 are represented as $s_k(i)$, where k is a subcarrier index and i is a symbol number index, a time domain complex baseband symbol x(t) may be represented as:

$$x(t) = \Sigma_k s_k(i) p_T(t - T_{sym}) \exp[j2\pi f_k(t - T_{sym} - \tau_k)] \quad (6)$$

Where $p_T(t)$ is a prototype filter function, $T_{symb}$ is the start time of the symbol period, □ is a subcarrier dependent time offset, and $f_k$ is the frequency of subcarrier k. Prototype functions $p_T(t)$ may be, for example, rectangular time domain pulses, Gaussian time domain pulses or any other suitable function.

Figure 6A:
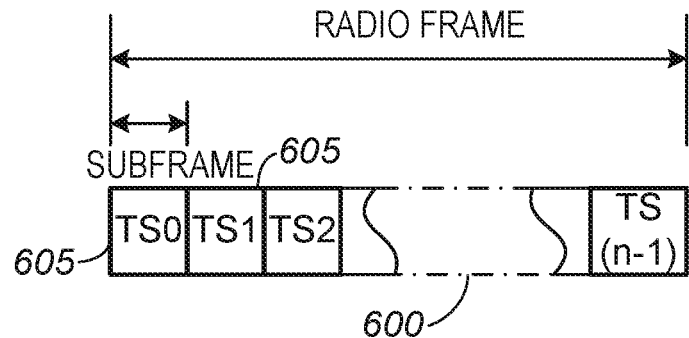
FIG. 6A illustrates a periodic radio frame structure, according to some aspects of the present disclosure.
Figure 6B:
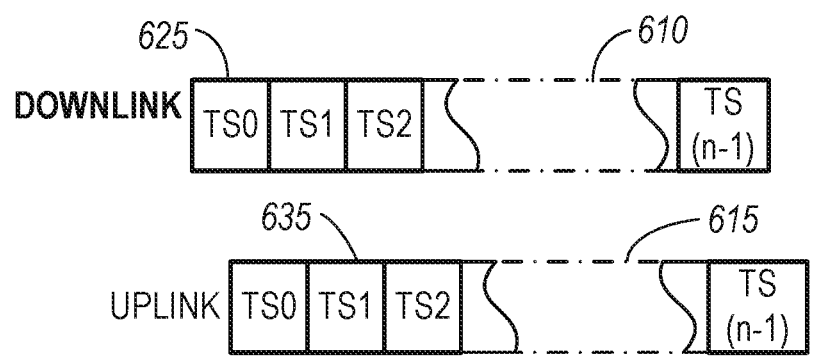
FIG. 6B illustrates a periodic radio frame structure using frequency division duplexing (FDD), according to some aspects of the present disclosure.
Figure 6C:
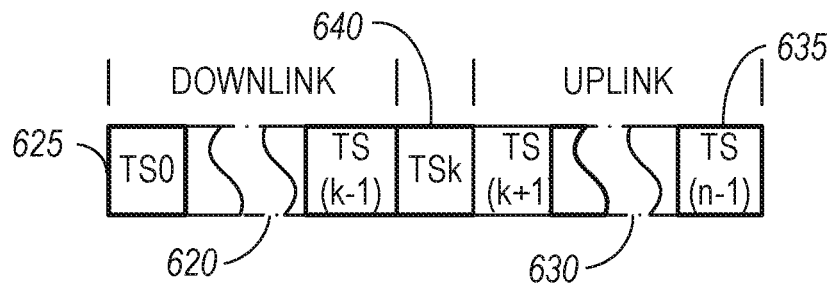
FIG. 6C illustrates a periodic radio frame structure, according to some aspects of the present disclosure.

FIGS. 6A, 6B and 6C illustrate frame formats that may be used in various aspects.

FIG. 6A illustrates a periodic radio frame structure 600 that may be used in various aspects. Radio frame structure 600 has a predetermined duration and repeats in a periodic manner with a repetition interval equal to the predetermined duration. Radio frame 600 is divided into two or more subframes 605. In an aspect, subframes may be of predetermined duration which may be unequal. In an alternative aspect, subframes may be of a duration which is determined dynamically and varies between subsequent repetitions of radio frame 600.

FIG. 6B illustrates an aspect of a periodic radio frame structure using frequency division duplexing (FDD). In an aspect of FDD, downlink radio frame structure 610 is transmitted by a base station to one or mobile devices, and uplink radio frame structure 620 is transmitted by a combination of one or more mobile devices to a base station.

Figure 7A:
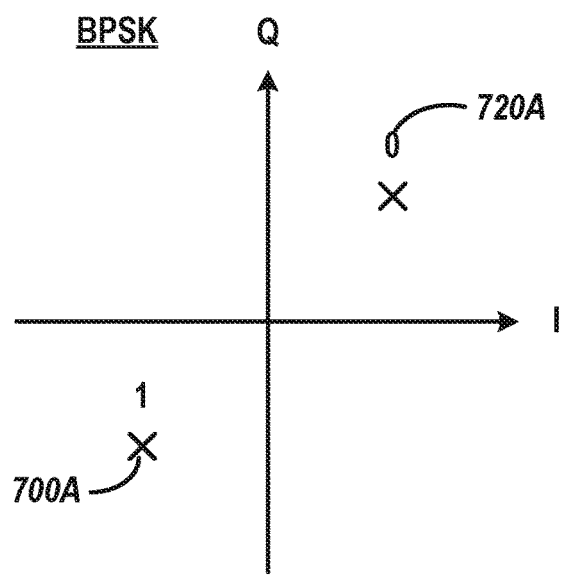
FIG. 7A illustrates a constellation design of a singe carrier modulation scheme containing two points, known as binary phase shift keying BPSK, according to some aspects of the present disclosure.
Figure 7B:
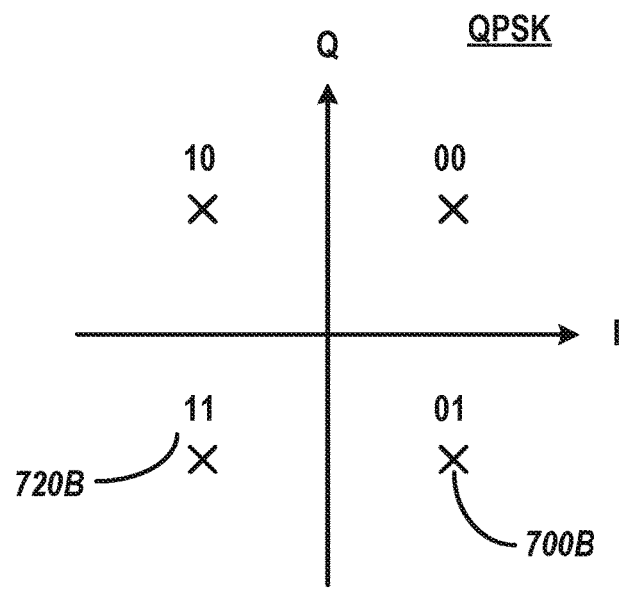
FIG. 7B illustrates a constellation design of a single carrier modulation scheme containing 4 points, known as quadrature phase shift keying (QPSK), according to some aspects of the present disclosure.
Figure 7C:
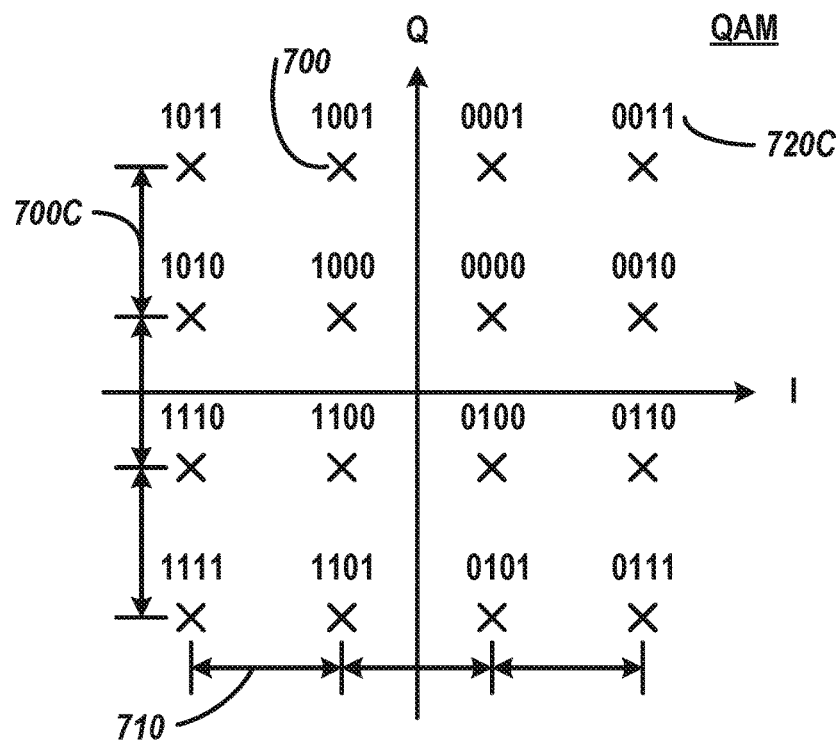
FIG. 7C illustrates a constellation design of a single carrier modulation scheme containing 16 points, known as quadrature amplitude modulation, according to some aspects of the present disclosure.

FIGS. 7A, 7B and 7C illustrate examples of constellation designs of a single carrier modulation scheme that may be transmitted or received by an aspect.

Constellation points 7XX, where XX indicates distinguishing numerals, are shown on orthogonal in-phase and quadrature (IQ) axes, representing respectively, amplitudes of sinusoids at the carrier frequency and separated in phase from one another by 90 degrees.

FIG. 7A represents a constellation containing 2 points 700A, 720A, known as binary phase shift keying (BPSK). FIG. 7B represents a constellation containing 4 points (two of which are enumerated as 720B, 700B) known as quadrature phase shift keying (QPSK). FIG. 7C represents a constellation containing 16 points 700, known as quadrature amplitude modulation (QAM) with 16 points (16QAM or QAM16). Higher order modulation constellations, containing for example 64, 256 or 1024 points may be similarly constructed.

In the constellations depicted in FIGS. 7A, 7B and 7C, binary codes 720A, 720B and 720C are assigned to the points 700A, 700B and 700C of the constellation using a scheme such that nearest-neighbor points, that is, pairs of points separated from each other by the minimum Euclidian distance, have an assigned binary code 720A, 720B 720C differing by only one binary digit. For example, in FIG. 7C, the point assigned code 1000 has nearest neighbor points assigned codes 1001, 0000, 1100 and 1010, each of which differs from 1000 by only one bit.

Figure 8A:
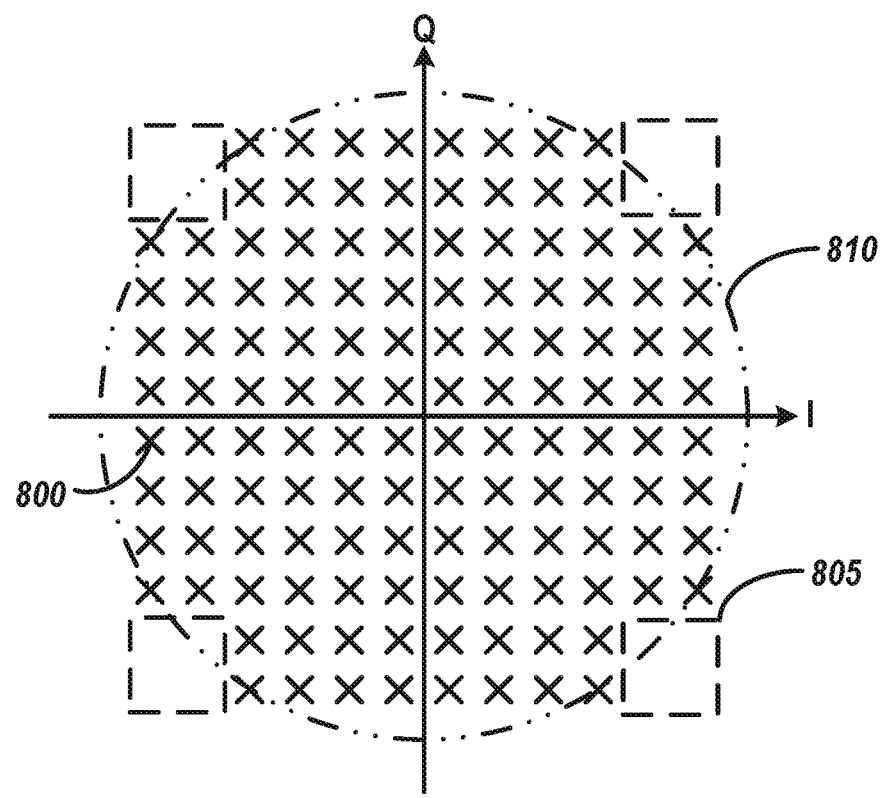
FIGS. 8A and 8B illustrate examples of alternate constellation designs of a single carrier modulation scheme that may be transmitted and received, according to some aspects of the present disclosure.
Figure 8B:
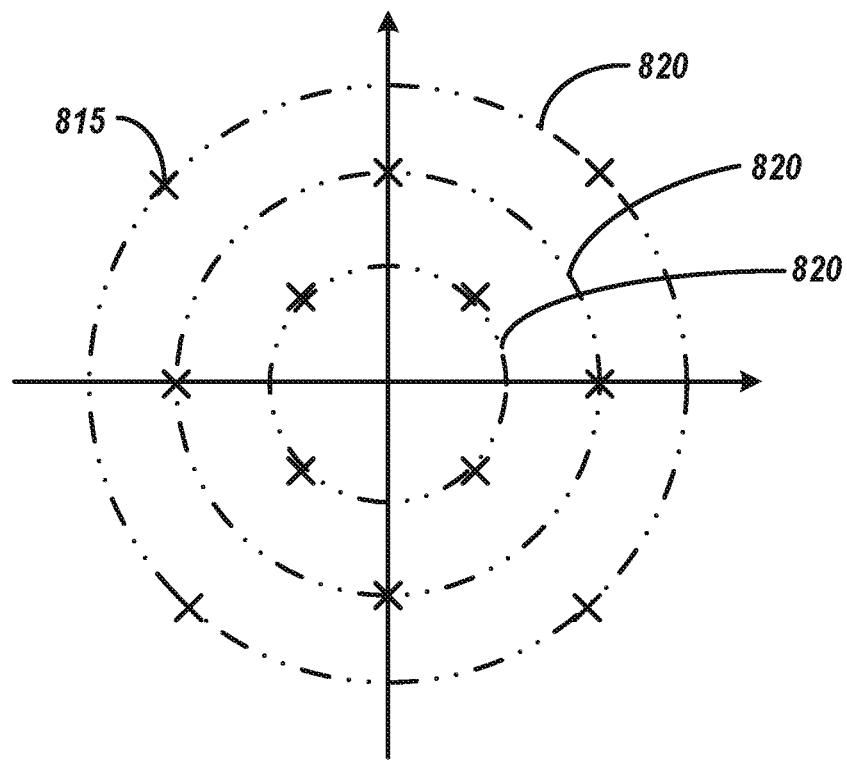

FIGS. 8A and 8B illustrate examples of alternate constellation designs of a single carrier modulation scheme that may be transmitted and received by some aspects of the present disclosure.

The next generation communication systems can utilize large antenna arrays for mmWave communication. Due to small wavelength, large numbers of RFFEs will be packed in a very small area to have the beamforming gain needed to compensate high path loss. However, one critical issue with mmWave systems is thermal management (sometimes referred to as thermal mitigation) of RFFE components. In general, the power efficiency of RFFE components decreases with operating frequency, which will generate a lot of excessive energy, and performance of these components depends on their temperature. In general heat sinks are used to transfer the heat out of the RFFE. However, when the small size of mmWave RFFE are considered, i) the performance of form factor appropriate thermal mitigations may be insufficient to keep the RFFE operating at optimal temperatures, and ii) distribution of heat over the RFEM can be uneven.

A previous solution to the thermal distribution problem is core hopping With core hopping an RFIC can be powered off for a short duration. In other words, in standard core hopping a subset of antennas or RFICs is active for transmissions and a subset is changing over time. However, frames sent during that duration have a significantly degraded beam, e.g., the beam width will be wider, the main lobe gain will be somewhat less, and the side lobe levels could be significantly worse. The core hopping approach would be especially inferior for broad beams, which may be heavily utilized during the beam refinement phase (BRP) and sector sweeps, because the pseudo-omni code word is very sensitive to which elements/quads/RFICs are active. This is because the elements/quads/RFICs are usually covering different angular targets, which is not the same as with a very narrow beam. On the other hand, the disclosed subject matter focuses on identifying multiple codebook code words that switch off selected RFFEs but remain other RFFEs active with a result that approaches, and in some aspects even surpasses, the beam quality (per the metrics above), versus having all antenna elements active. In particular, the system can cycle (or iterate) through the good alternatives to all elements active in a manner that reduces the duty cycle on a per array quad or per array element basis, depending on the limitations of the RFIC, so as to reduce spatial hotspots in the RFIC. The terms RFIC and RFFE may be used herein to mean the same element or component. The codebook referred to above can be considered an RFFE thinning codebook as compared to a beamforming codebook.

Figure 9:
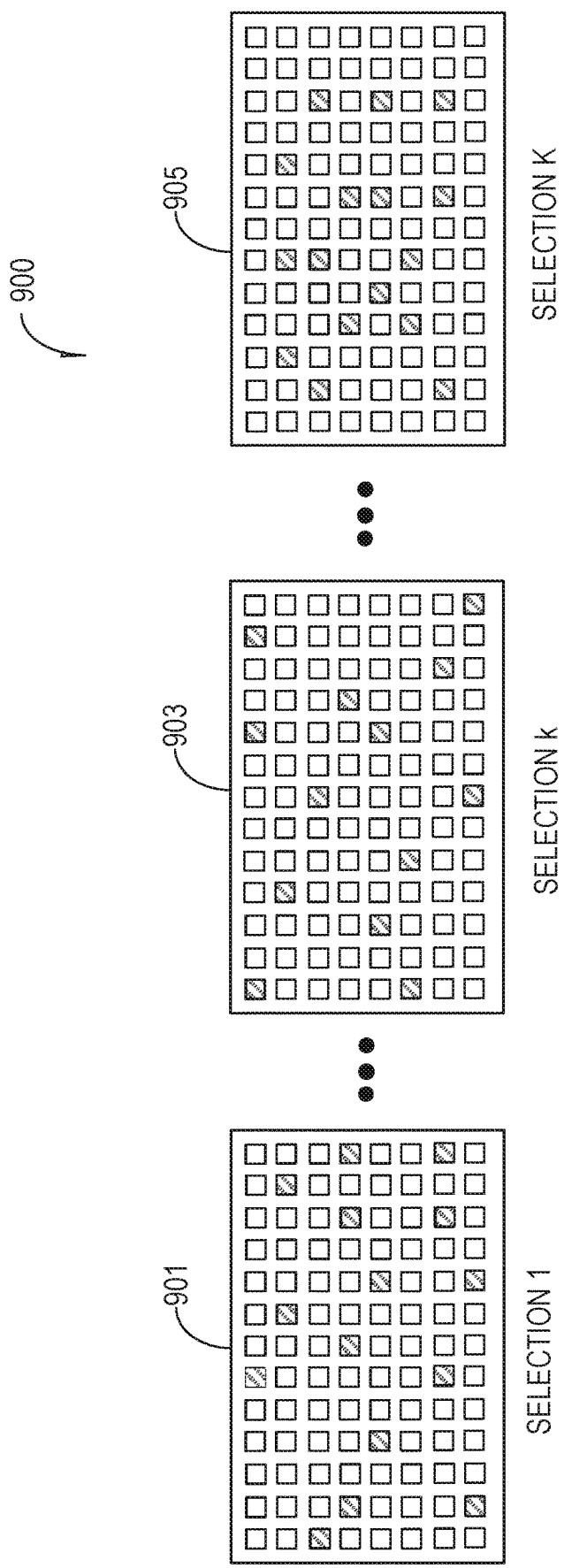
FIG. 9 illustrates an antenna array system with smart radio frequency front end (RFFE) selection sequence to distribute heat over the antenna array, according to some aspects of the present disclosure.

The disclosed subject matter responds to real-time thermal measurements to select the code words that will provide the most desirable cooling for the current hotspot locations. In short, an algorithmic method is disclosed to design a codebook which reduces the total number of active RFFEs used at a time, while reducing side lobe levels of the array pattern, is disclosed. Then, the designed codebook is used to switch off a subset of RFFEs over time without affecting performance of the existing beamforming codebook. An example RFFE selection scheme is shown in FIG. 9, discussed below. The algorithm for a TX/RX chain selection scheme that is created reduces spatial thermal density, where the term "Tx/RX chain" is understood to mean a complete path through a transmitter and transmit/receive antennas and finally through a receiver. This also enables low power mmWave systems by turning off the entire TX/RX chain including power amplifier (PA), low noise amplifier (LNA), phase shifters, and other active components. This enables small form factor RFFE design. In some aspects of the present disclosure, the heat sink can perhaps be removed completely.

In the disclosed subject matter, code words are determined that for a very specific beam are the most nearly optimal to reproduce all-elements code word beam performance, by assembling a set of antenna thinning code words that can allow every quad (or element) to be idle for a configurable duration. This means determining a diverse set of code words for the given beam, that results in an adaptive or flexible capability to dial up or down the degree of thinning thus reducing the duty cycle of hotspots. Stated another way the method responds to real-time thermal measurements to choose the code words that will provide nearly or essentially the best cooling for the current hotspot locations.

Further, previous solutions do not have stable beam shaping because they experience different effective channels when switching over code words of a codebook. However, maintaining a fixed beam pattern for seamless switching over the code words of codebook is desirable. This desirable result is achieved by the code word switching and RFIC rotation disclosed, which is practically transparent from a receiver perspective. Further still, previous solutions do not guarantee a desirable beam pattern in terms of side lobe level, beam width, beam gain and related parameters after turning off a subset of RFICs. However, a switching interval for executing the disclosed code words is slower, as compared to standard core hopping and therefore keeps the communication channel virtually fixed from the receiver point of view, which is desirable. Finally, previous solutions do not respond to real-time thermal measurements to choose the code words that will provide the best cooling for the current hotspot locations.

As yet another advantage, disclosed simple switching over of antennas improves beam forming by a specific binary optimization method, which is adapted to obtain a specific beam with reduced side lobes, and with a desirable beam gin, thus providing stable beam pattern shaping with high or nearly maximum, diversity.

FIG. 9 illustrates an antenna array system with a smart RFFE selection sequence to distribute heat, or thermal density, over the antenna array, according to some aspects of the present disclosure. FIG. 9 represents k iterations (or selections) 900 of turning RFFEs on and off by code word, where k=1, . . . , K. In FIG. 9, K is 3. At 901, 903, 905, the clear squares represent RFFEs that are turned on and the cross-hatched squares represent RFFEs that are switched off by a code word. At 901, selection 1 in the sequence of 1, . . . , k, . . . , K, the cross-hatched squares represent RFFEs that by real-time thermal measurement are found, at the time of selection 1, to require thermal management (sometimes referred to as thermal mitigation) and are switched off by the code words, that are generated by the algorithms discussed below. At 903, selection k in the sequence of 1, . . . , k, . . . , K, the cross-hatched squares represent RFFEs that are found by real-time thermal measurement at the time of selection k to require thermal management and are switched off by the algorithm. At 905, selection K in the sequence of 1, . . . , k, . . . , K, the cross-hatched squares represent RFFEs that are found by real-time thermal measurement at the time of selection k to require thermal management and are switched off by the algorithm. This illustrates sequencing the switching of RFFEs off by iteration of code words based on real-time thermal measurement in the RFFEs.

Figure 9A:
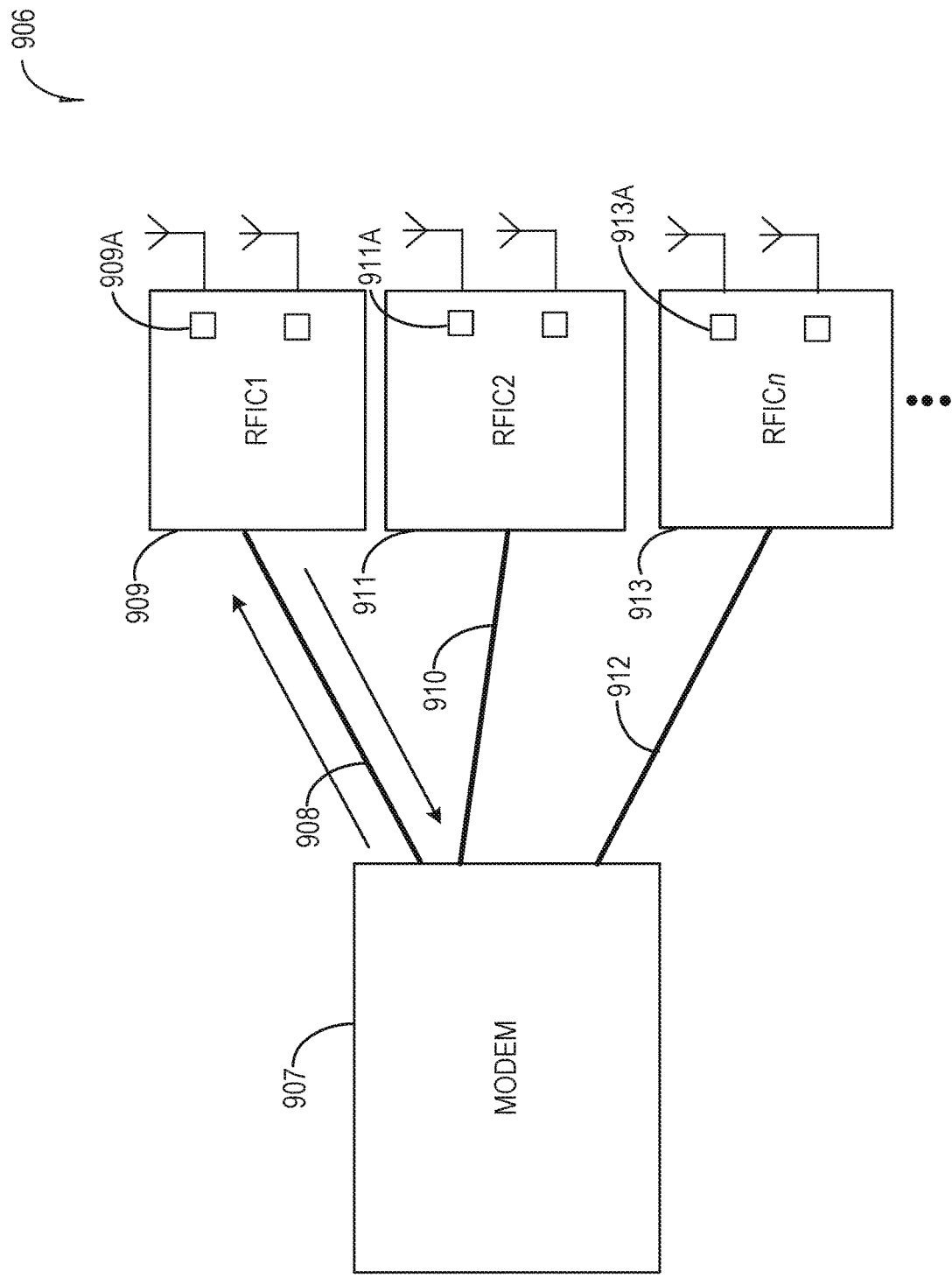
FIG. 9A is a diagram of hardware configured to measure temperature at one more locations within each radio frequency integrated circuit (RFIC), according to some aspects of the present disclosure.

FIG. 9A is a diagram 906 of hardware configured to physically measure temperature at one more locations within each RFIC, according to some aspects of the disclosure. The below-described thermal measurement implementation may be a physical part of a wireless mobile communication device itself. Modem 907 may be coupled to a plurality of RFICs. Modem 907 is coupled to RFIC1 1909 by line 908, to RFIC2 911 by line 910, and to RFICn 913 by line 912, where lines 908, 910 and 912 are coupled to a control communications interface between modem 907 and the RFICs, according to some aspects of the disclosure. In the disclosed implementation, baseband modem 907 interrogates the current temperature from one or more RFICs 909, 911, 913, . . . , which may be accomplished by a command sent over the control communications interface which, in some aspects could be over a Manchester encoded 300 MHz control channel. With respect to RFIC 909, a first step may be for modem 907 to send a temperature read command, which may be entitled "TEMP" to either a single RFIC 909, or, in some aspects, broadcast to all RFICs 909, 911, . . . , 913. The RFIC to which the TEMP command is sent may sample temperature using thermal sensors at one or more locations within the RFIC, such as, in some aspects, per feed to the antenna array that is coupled to the RFIC, thus leveraging the integrated circuitry of the RFICs as indicated at 909A, 911A, . . . , 913A, which illustrates the "per feed to the antenna array." However, the thermal sensors could be located elsewhere in an RFIC, as needed. In some aspects the thermal sensors are distributed within the RFIC of the RFFE, per quad of antenna elements, and the control communication is sent from the baseband modem to the corresponding RFIC in order to interrogate the temperature as discussed above.

In a second step the RFIC(s) return the current temperature to baseband modem 907. At step 3, firmware running on the modem 907 may leverage the current temperature measurements at the various special locations within the RFIC. This may be implemented for each of the subsystems of an antenna array, according to some aspects of the disclosure. The temperature measurements are used to determine the weight fed to an algorithm that selects the desired duty cycle of the circuitry that feeds each antenna element in the array, as discussed above in this paragraph.

The key concept is that each code word candidate has a particular duty cycle profile based on the elements that are not used for the beam, or are used at a lower power level. The objective is to select/schedule those one or more code words such that the low duty cycle of specific elements corresponds to the measured high temperature of the circuitry supporting those elements. In additional detail, algorithms implemented on the modem or other processing elements leverage the temperature measurements received from different spatial regions within one or more RFICs such as per LNA/PA/phase shifters/switch feeding each element or subarray within the array. The objective of these algorithms is to identify and mitigate hotspots within the one or more RFICs feeding the antenna array. The temperature measurements are used to determine whether specific portions of the system are operating at sufficiently high temperature levels which could impact performance. A desired duty cycle of operation for each spatial region can be determined based on these temperature measurements with hotter regions being identified to operate at a lower duty cycle until the operating temperature in these regions is brought down to the desired temperature. Using this information about the current hotspots and the desired duty cycle to mitigate these hotspots, codewords of a thinning code book can be selected which in aggregate achieve the desired duty cycle of operation in the identified hot spatial regions. This is accomplished since each of the interchangeable code words offer similar beams but with different sets of elements idle or operating at a lower transmit power. Thus, the scheduling of the appropriate code words effectively reduces the duty cycle of operation of the circuitry within the hotspots identified to meet the desired duty cycle, and results in a reduction of heat in these hotspots.

Figure 10:
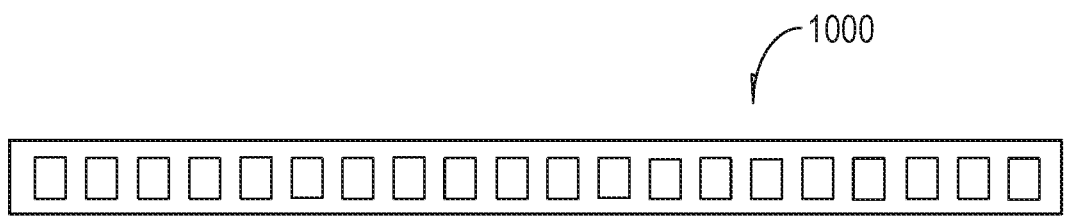
FIG. 10 illustrates a uniform linear antenna array with ten antenna elements.

FIG. 10 illustrates a uniform linear antenna array 1000 with twenty antenna elements. The algorithm that controls the switching of FIG. 9 is explained with respect to the uniform linear antenna array shown in FIG. 10, and can be then extended to rectangular antenna arrays. An indicator vector for TX/RX chain selection can be denoted by $d_i=[d_0, d_1, \ldots, d_N]$, where N is the total number of RFFEs such that $d_i \in \{0,1\}$, i=0, ..., N. Here, in $\{0, 1\}$ means a TX/RX chain is turned off and 1 means a TX/RX chain is turned on. Next, the problem can be formulated such that M RFFEs out of N RFFEs are selected, (where M<N), such that the side lobes are reduced while maintaining the similar beamforming gain 20 $\log_{10}$ M. Accordingly, l∞-norm minimization, can be used to reduce side lobe levels. This means minimizing the maximum values of the individual elements of vector F(θ) Ad in Equation (7), below, where each element of vector F(θ)Ad represents array gain over side lobe, and minimizing the maximum values represents minimizing the side lobes. This has been discussed in the paper C. Rusu, N. González-Prelcic and R. W. Heath, "*Antenna array thinning for antenna selection in millimeter wave MIMO systems,*" 2016 IEEE International Conference on Acoustics, Speech and Signal Processing (ICASSP), Shanghai, 2016, pp. 3416-3420. Therefore, the problem can be formulated as follows:

$$\min_{d_i \in [0,1], \Sigma_i d_i = M} \|F(\theta)Ad\|_\infty \tag{7}$$

Where F(θ)Ad is a vector and the illustrated function is a diagonal matrix of antenna pattern $f(\Theta_k)$, k=1, ..., K, and the minimization is minimizing the elements of the vector, which represents minimizing the side lobes. The matrix $A \in \mathbb{C}^{K \times N}$ is given by the set of vectors corresponding to azimuth angles located at the side lobes as follows:

$$A = \begin{bmatrix} a_1^T \\ \vdots \\ a_k^T \\ \vdots \\ a_K^T \end{bmatrix} = \begin{bmatrix} 1 & e^{j\frac{2\pi}{\lambda}d_a \cos(\theta_1)} & \cdots & e^{j\frac{2\pi}{\lambda}d_a(N-1)\cos(\theta_1)} \\ \vdots & \vdots & \vdots & \vdots \\ 1 & e^{j\frac{2\pi}{\lambda}d_a \cos(\theta_k)} & \cdots & e^{j\frac{2\pi}{\lambda}d_a(N-1)\cos(\theta_k)} \\ \vdots & \vdots & \vdots & \vdots \\ 1 & e^{j\frac{2\pi}{\lambda}d_a \cos(\theta_K)} & \cdots & e^{j\frac{2\pi}{\lambda}d_a(N-1)\cos(\theta_K)} \end{bmatrix} \tag{8}$$

where
$d_a$ is inter-radiator element distance for a uniform linear antenna array in terms of wavelength λ;
a is the array response vector for the angle of arrival or angle of departure, $\Theta_k$, and T is a transpose operator.
Defining the matrix A on the antenna pattern F(Θ) keeps the maximum side lobe levels to a minimum.

The above is a binary l∞-norm minimization problem which means that it is a non-convex and NP-hard problem. Therefore, a weighted convex relaxation technique can be used, as shown, e.g., in the above-cited paper C. Rusu, N. González-Prelcic and R. W. Heath, or in the paper, B. Fuchs, "*Synthesis of Sparse Arrays With Focused or Shaped Beam pattern via Sequential Convex Optimizations,*" in IEEE Transactions on Antennas and Propagation, vol. 60, no. 7, pp. 3499-3503, July 2012. These two papers are two examples among many. In this disclosure, we will use a technique which adds a penalty to an objective function such that norm maximization is achieved for binary variables $b_i$.

$$\min_{b_i \in [0,1], \Sigma_i d_i = M} \|F(\theta)Ad\|_\infty + \frac{w^H b}{M} \tag{9}$$

where $b_i$ is relaxation of $d_i$. In the original problem formulation in (7), $d_i$ was either 0 or 1. In equation (9), we replace $d_i$ with $b_i$ such that $b_i$ can be a real number between 0 and 1, i.e., $b_i \in [0,1]$. In equation (9), the second term is relaxation term for weighted optimization of $b_i$ for faster convergence. The weight is given by vector w.

A method to determine a set of TX/RX chain selection vectors, namely a codebook, such that a desired thermal density is achieved, will now be described. The designed codebook can account for the expected or real-time measured thermal buildup throughout the antenna array, as discussed above, for the purposes of statistically shifting which code words are selected, thus improving the ability of the system to adapt to hotspots in the system and to therefore minimize the peak spatial thermal density during operation, while maximizing beam quality. In respect of expected thermal buildup, if the thermal buildup is predictable, the codebook can be designed offline.

Codebook Design for TX/RX Chain Selection

One step of the method is the determination of the selection of the number of active TX/RX chains, M, out of N TX/RX chains where M TX/RX chains are required to maintain the desired beam forming gin of 10 log 10(M). Since operating a fewer number of antennas means less radiated power, assuming that each TX chain has its own power amplifier, and less combining gin for the RX chain, the total number of active TX/RX chains should be selected such that the communication link has enough beamforming gin, i.e., the desired beamforming gain≤20 log 10 M. Turning off N-M TX/RX chains will save roughly (N−M)/N % of the power at the RFIC. In addition, the M should be selected considering the tradeoffs of signal to noise ratio (SNR) limitations, spatial thermal overload, and interference risk, meaning victim and/or aggressor. SNR limitation is upper bounded by 20 $\log_{10}$ M. The purpose of the propose algorithm is thermal density reduction at the antenna array. Thermal density reduction is achieved by turning off some of the RFFE elements. Therefore, reducing thermal overload can decrease SNR gain due to decrease at the beamforming gain, but the disclosed code word based antenna thinning keeps the SNR decrease to a minimum, which may be considered a side benefit of the described optimization. Sub-optimal RFFE switching antenna elements off may increase beam width and side-lobe level. This may increase interference. The proposed solution (optimized RFFE switching by code word-based antenna thinning), on the other hand, minimizes increase in beam width and in side lobe level, and minimizes interference increase, and therefore represents significant improvements over other methods. Further, turning off RFFEs results in loss of beam forming gin. However, the described optimization results in the loss of beam forming gin being minimal compared to other solutions, such as modular antenna switching as shown by simulated results discussed below.

Figure 10A:
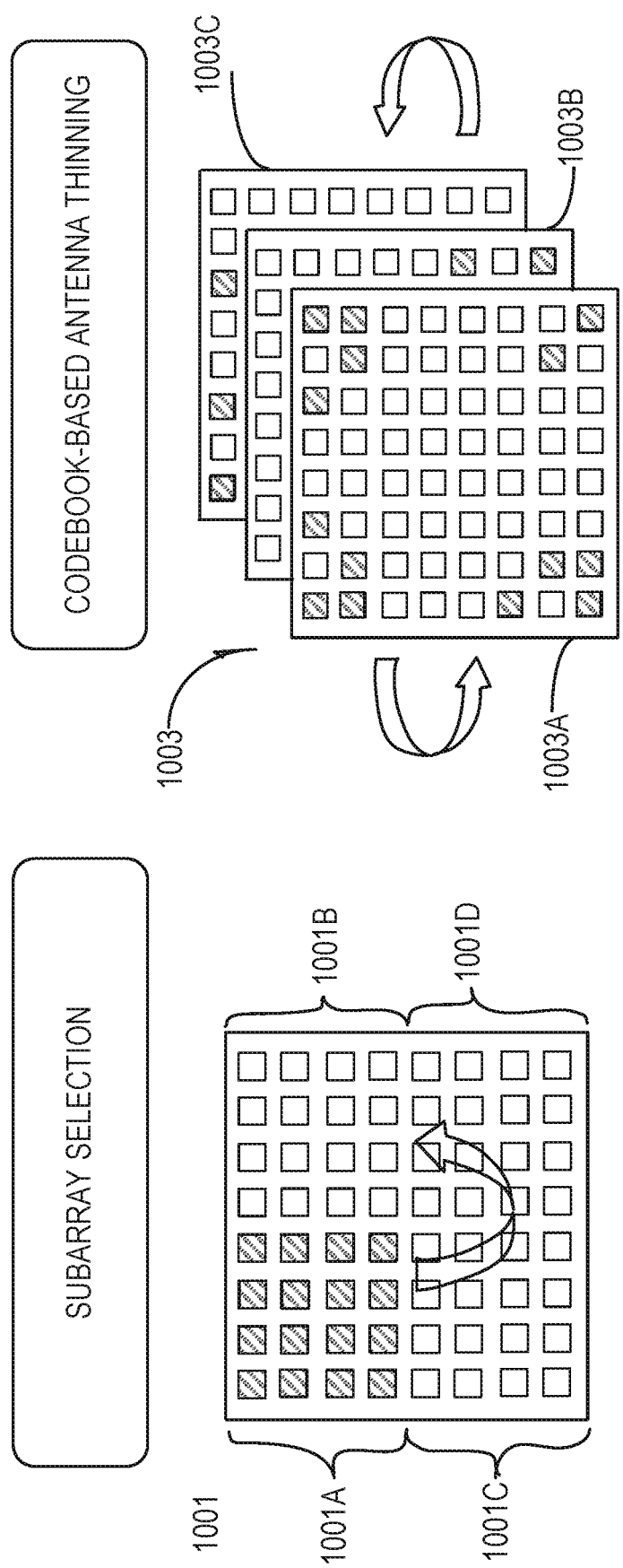
FIG. 10A illustrates subarray selection and codebook antenna thinning according to some aspects of the present disclosure.

A second step in creating the codebook is to iteratively design code words for the codebook. Since the codebook is designed such that good thermal density is achieved, some of the TX/RX chains can be preselected that have to be turned off, and then find the remaining TX/RX chains that can be switched off to have essentially the lowest side lobe level, and that results in the required number of TX/RX chains to be turned off. Subarray type RFFE selection is a special case of the suggested algorithm such that preselection of M TX/RX chains out of N TX/RX chains on a modular basis may occur (use of one half or one fourth of array at a time etc.). The special case is switching off contiguous subsets of RFFEs as shown in FIG. 10A. FIG. 10A illustrates both subarray selection and codebook antenna thinning according to some aspects of the present disclosure. Subarray selection is not optimized and is represented with respect to array 1001. Array element groups 1001A, 1001B, 1001C and 1001D are subarrays of 4×4 elements of an 8×8 array. Subarray selection can be used as an approach to thermal mitigation without any optimization where subarrays may be switched, for example, from 1001A, to 1001B, 1001C to 1001D. Since antenna arrays are designed in modular fashion, i.e., small antenna arrays are put together to have a larger antenna array, turning off subarrays can be considered as a thermal mitigation solution but it is sub-optimal and results in growth of side lobes and growth of beam width, neither of which is desirable. In codebook-based antenna thinning antenna elements are turned on and off according to a codebook, where in the antenna array 1003, antenna array elements are selected to be turned off according to code words which results in on/off patterns, parts of which are seen in 1003A, 1003B, 1003C and 1003D. As compared to subarray selection, the disclosed codebook-based antenna thinning results in binary (on/off) optimization, or improvement, wherein the beam width is maintained and the side lobes are lower. The algorithms used for codebook design are discussed herein below.

---

Algorithm-1 (Selects which ones of the M RFFEs are to be off for one code word in the codebook.)

---

Input: $w^{(0)} = 1_N$, where $1_N$ is vector of 1 of size N, M is the number of RFFEs that need to be turned off M, d is set to a binary vector with preselected elements that are zero, iteration number K, $Z = \{1, \ldots, N\}$. Set $Z \leftarrow Z \backslash m$, m is the index of zero element in vector of d which is an auxiliary vector to keep track of index of turned on and turned off RFFEs.

$b \leftarrow d$ while $|Z| > M$

For K iterations

• Solve $$\min_{b_i \in [0,1], \sum_i b_i = M, \, i \in Z} \|F(\theta)Ab\|_\infty + \frac{w^H b}{M} \quad (10)$$

• Update $w_i \leftarrow 1 - b_i, i \in Z$

End

• $m = \arg\min_i b_i$

• $Z \leftarrow Z \backslash m$, $d_m = 0$.

End

---

The codebook may then be designed for good thermal density by a second algorithm:

---

Algorithm-2

---

Input:
The set of essential TX/RX chains for thermal distribution that is switched off at the time the thermal measurement is made, $\mathcal{D} = 0$.

while $d_i = 0, \forall i \in \{1, \ldots, N\} \, \forall d \in \mathcal{D}$, where $\mathcal{D}$ is the codebook.

Select some indexes i such that $d_i \neq 0, \forall i \in \{1, \ldots, N\} \, \forall d \in \mathcal{D}$, solve Algorithm-1

$\mathcal{D} \leftarrow \mathcal{D} \cup d$

End

---

Figure 11:
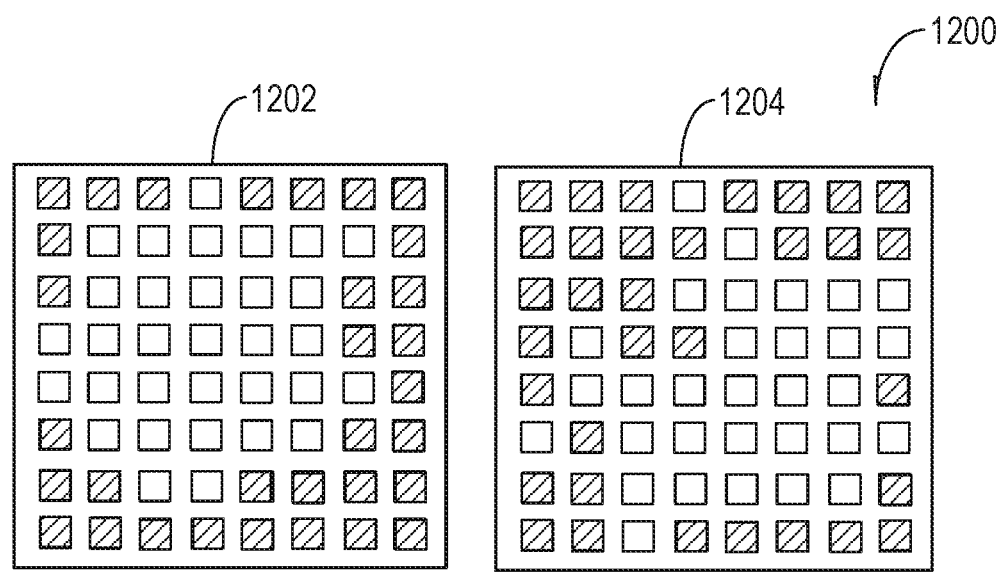
FIG. 11 illustrates an example of TX/RX selection for thermal density, according to some aspects of the present disclosure.

FIG. 11 illustrates an example 1100 of TX/RX selection for thermal density, according to some aspects of the present disclosure. Performance for an N=8×8, or 64, element rectangular array will be discussed. Consider M=32. This means that there is about 50% less power dissipation at the RF front end. The codebook is given by the symbol $\mathcal{D}$. for FIG. 11, seen at 1100 are two codewords 1102, 1104 that have been generated for TX/RX chain selection. In one aspect of the disclosure, in order to cover all codewords, 9 codewords are generated to be able to turn-off each RFFE at least once. This means that some antenna elements can be turned off more than once to get a desired beam pattern for all codewords. The codeword-based antenna thinning in this case was simulated and when compared with subarray type TX/RX chain selection in which only half of the (8×4) or 32 array is activated to have the same number of active elements (i.e., 32), the codeword-based thermal mitigation actually increased the main lobe by about 0.35 dB while decreasing the side lobes by 7.1 dB.

Figure 12:
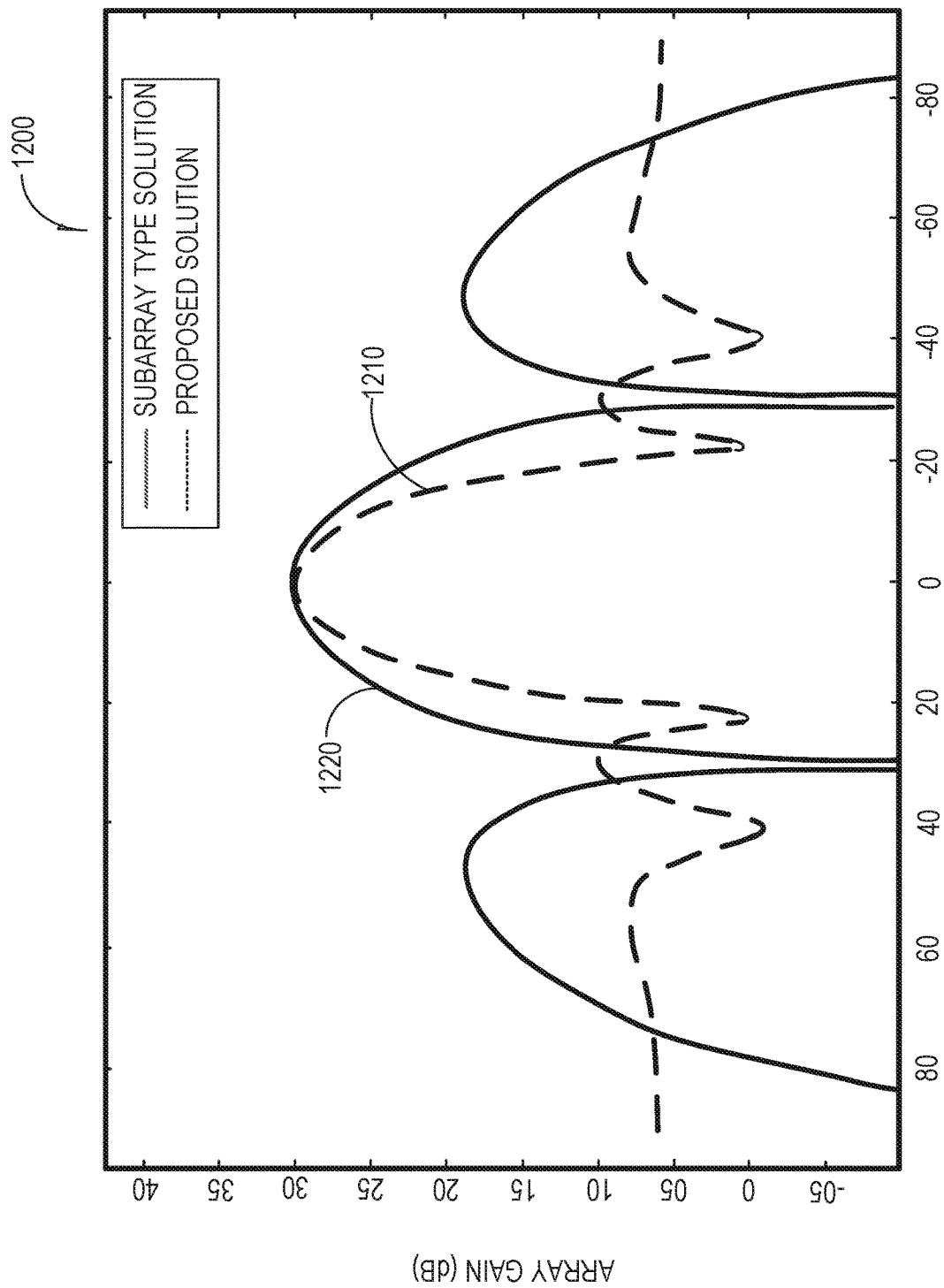
FIG. 12 illustrates comparison of the array patterns of an antenna array using the disclosed thermal mitigation with subarray type TX/RX chain selection, according to some aspects of the present disclosure.

FIG. 12 illustrates at 1200 a comparison of simulated array patterns of an antenna array using the disclosed thermal mitigation with array patterns of subarray type TX/RX chain selection, according to some aspects of the present disclosure. In FIG. 12, only half of the (4×8) array is activated to have the same number of active elements, i.e., 32. Curve 1310 is array gin with the disclosed codeword-based thermal mitigation and curve 1320 illustrates array in with subarray-type thermal mitigation. Comparison of the two curves illustrates that there is essentially no loss at main beam power which is 20 $\log_{10}$ M=20 $\log_{10}$ 32=30.1030 dB. This means that switching RFFE elements according to the disclosed thermal mitigation method will keep the existing effective channel to maintain the beam pattern as similar as possible when an antenna element is switched from an "on" condition to an "off" condition.

Figure 13:
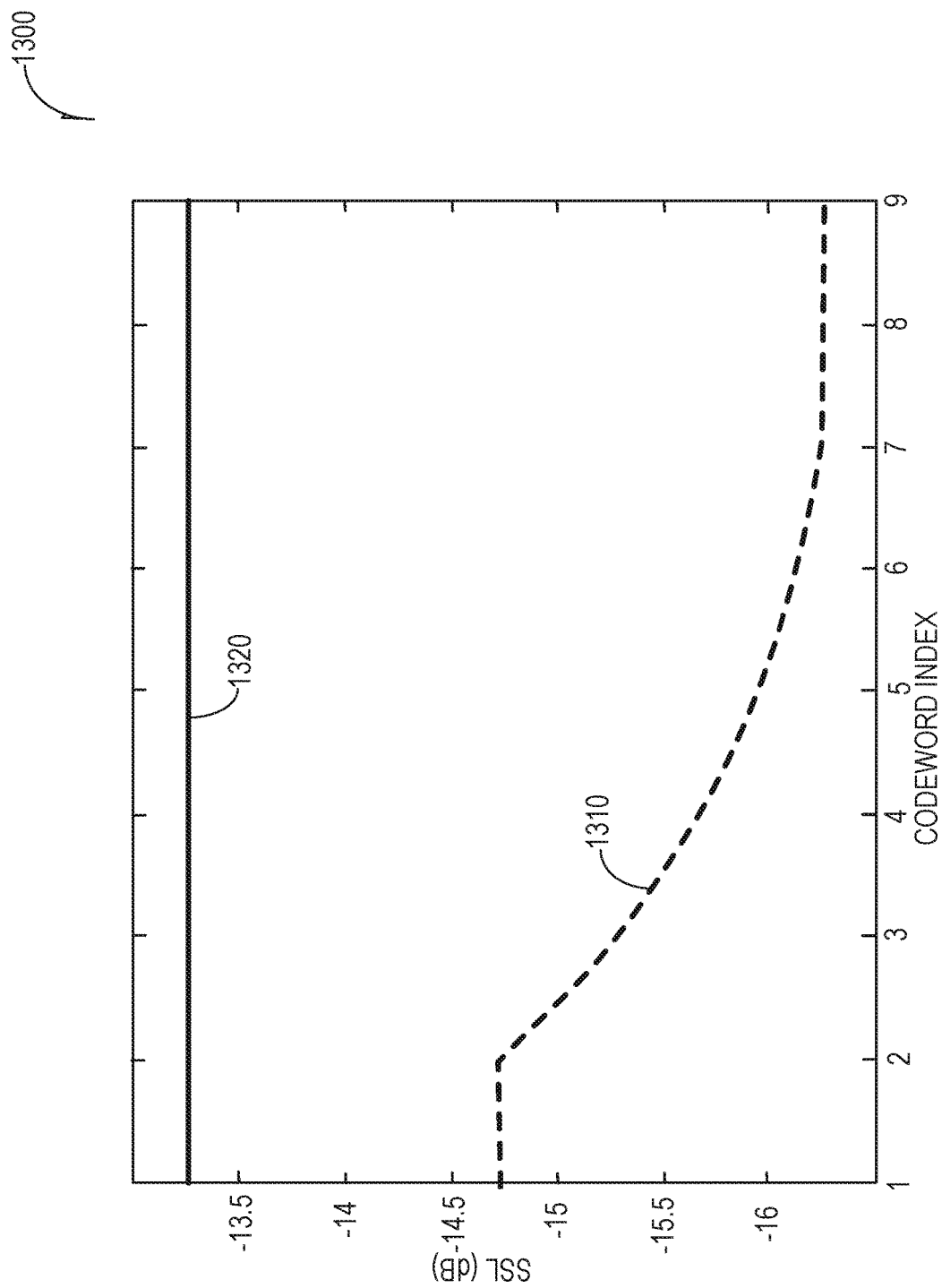
FIG. 13 illustrates a comparison of side lobe levels (SLL) with simulated antenna array operation in accordance with the present disclosure, and SLL of simple sub-antenna array type operation, according to some aspects of the present disclosure.

FIG. 13 illustrates at 1300 a comparison of side lobe levels (SLL) with simulated antenna array operation in accordance with the present disclosure, and operation of simple subantenna array type TX/RX selection, according to some aspects of the present disclosure. Curve 1410 represents the side lobe level with the disclosed thermal mitigation method used and curve 1420 represents the side lobe level using subarray-based TX/RX chain selection. The side lobe levels (SLL) of the proposed codebook operation can be seen by observation to be significantly lower than with subarray type TX/RX selection. The horizontal axis in FIG. 13 represents indexes of codewords that are generated for the example 1200 of TX/RX selection in FIG. 12.

Figure 14:
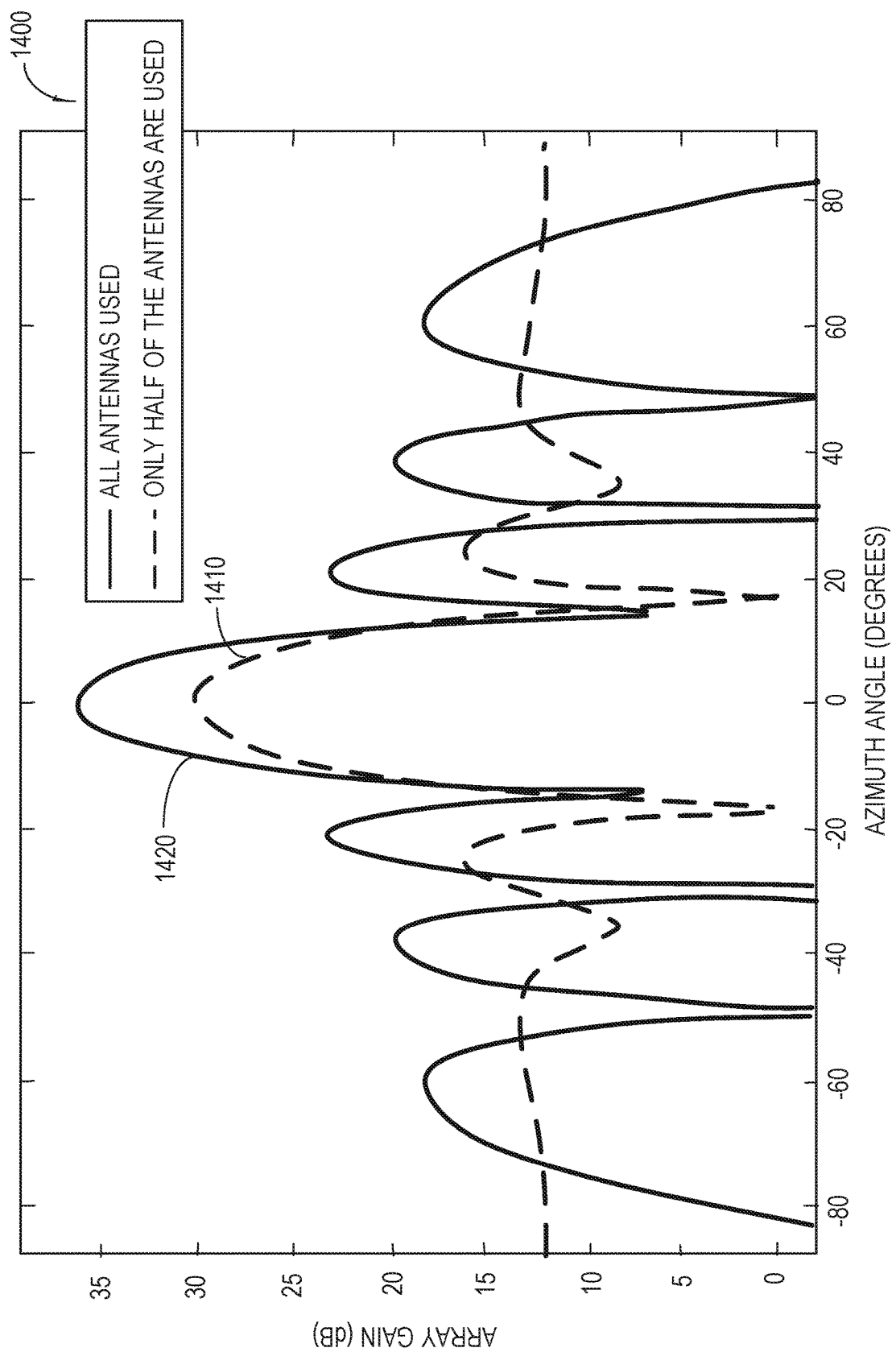
FIG. 14 illustrates a comparison of antenna array gin as a function of azimuth when all antennas are operated, and antenna array in when the antenna array is operated in accordance with the disclosed thermal mitigation, according to some aspects of the present disclosure.

FIG. 14 illustrates at 1500 a comparison of antenna array gain as a function of azimuth when all antennas are operated, and antenna array gain when the antenna array is operated with the disclosed thermal mitigation method, according to some aspects of the present disclosure. FIG. 14 was achieved using simulation. Curve 1510 illustrates the array gain using the disclosed thermal mitigation, and curve 1520 illustrates the array actor with all antennas used. By observation it can be seen that the case when all the TX/RX chains are used for beamforming versus the case of using half the antennas results in a difference at maximum beamforming gain is approximately 6 dB. The SLL is about 1 dB lower than the case in which all the TX/RX chains are used. In this case beam width was similar while the side lobes were reduced. The comparison is a two-dimensional plot. A simulated three-dimensional plot illustrates the same comparison result.

Figure 15:
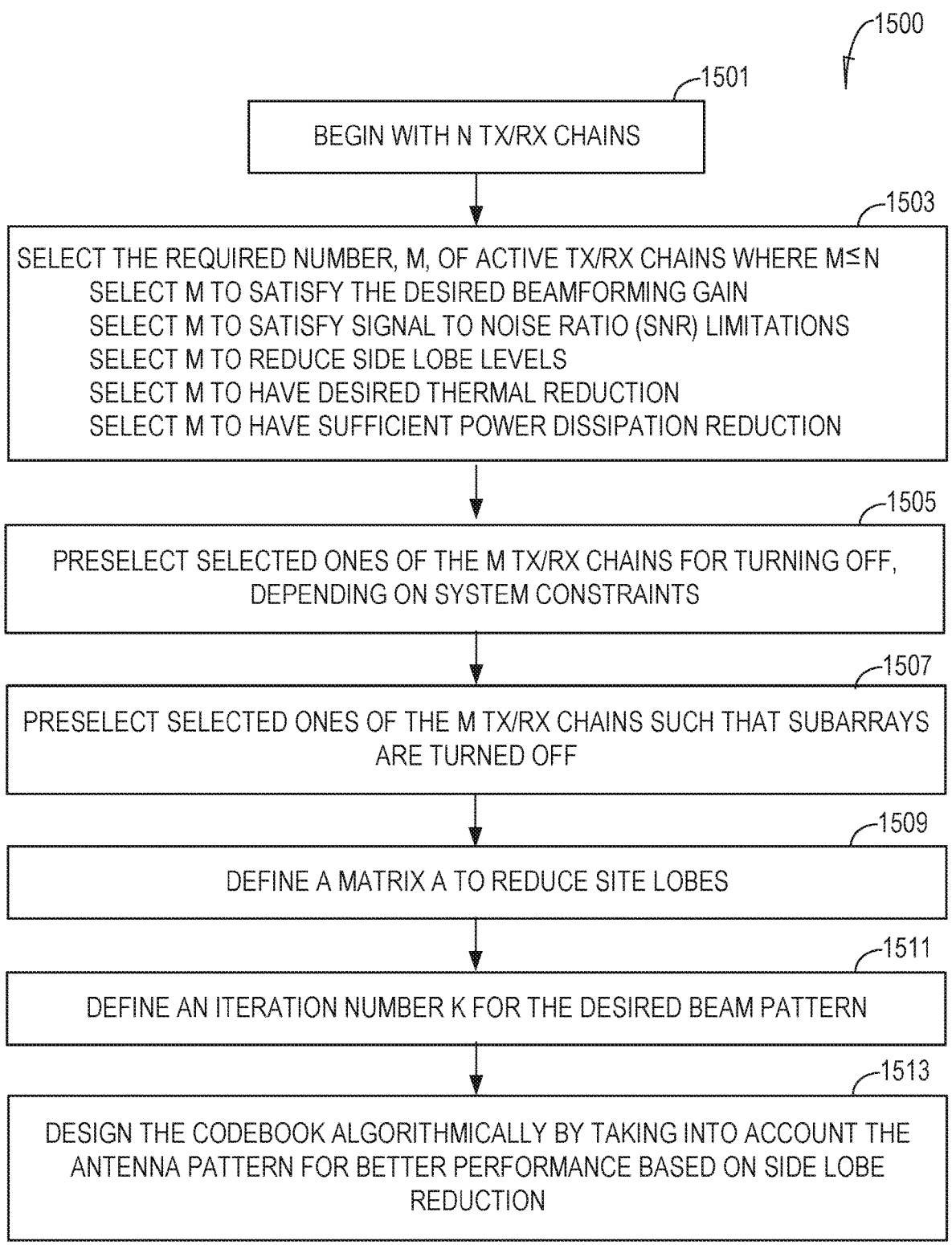
FIG. 15 is a flow chart that illustrates a method, according to some aspects of the present disclosure.

FIG. 15 is a flow chart that illustrates a method 1500, according to some aspects of the present disclosure. At 1501 the method begins with N TX/RX chains. At 1503 the Number M is selected, where M is less than N. M is selected to satisfy the desired beamforming gain, 10 log 10(M). M is also selected to satisfy SNR limitations and to reduce side lobe levels. M is also selected to have the desired thermal reduction and sufficient power dissipation reduction. At 1505, ones of the M TX/RX chains are preselected for turn-off, depending on system constraints. At 1507, ones of the TX/RX chains are preselected such that subarrays are turned off. At 1509 Matrix A is defined to reduce side lobes. At 1511, an iteration number K is defined for the desired beam pattern. At 1513, the codebook is designed algorithmically, based on Algorithm 1 and Algorithm 2 discussed above, by taking into account the antenna pattern for better performance based on side lobe reduction.

Figure 16:
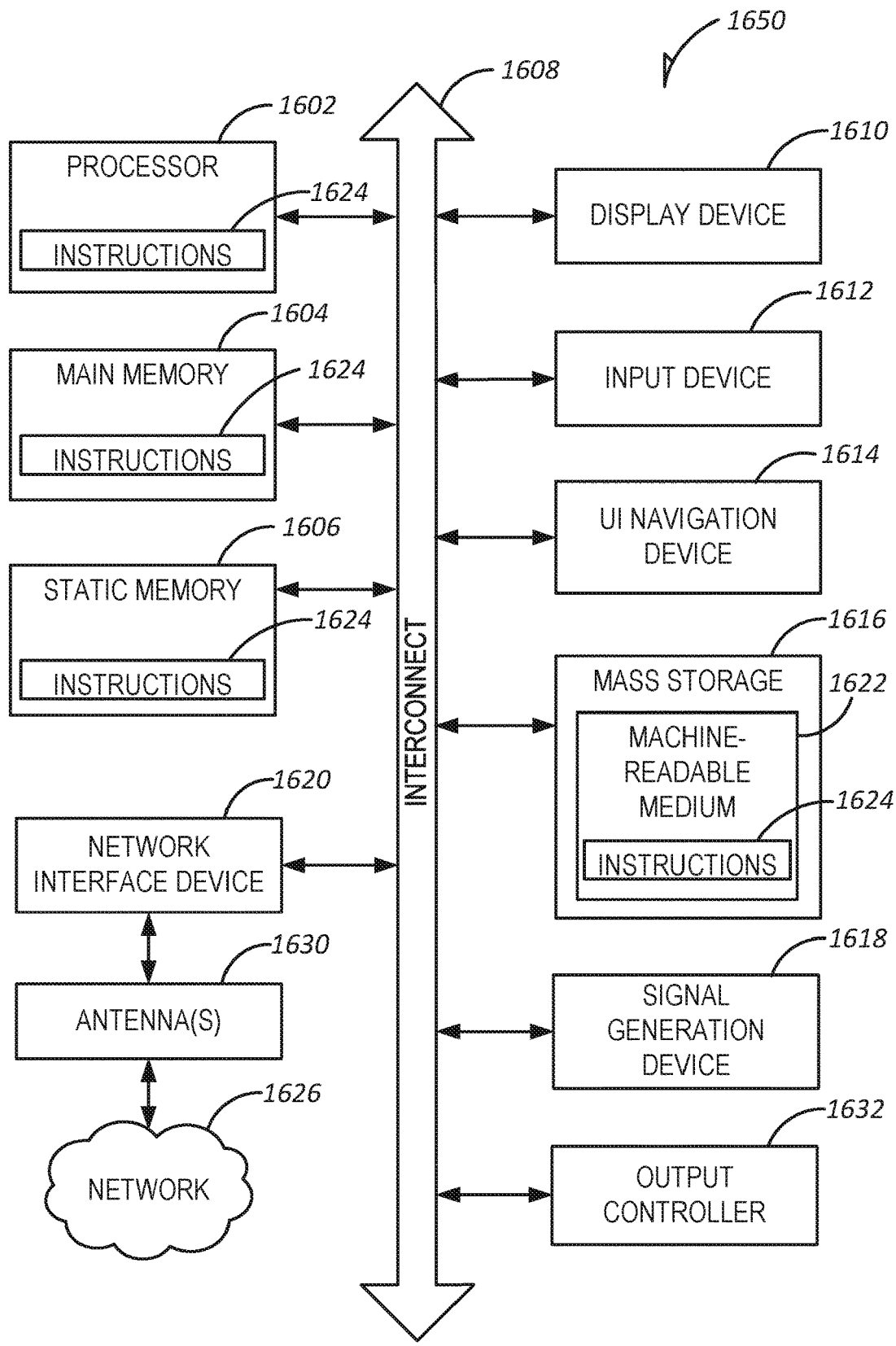
FIG. 16 is a block diagram of an example machine upon which any one or more of the techniques or methodologies discussed herein may be performed, or in which apparatus discussed herein may be incorporated or used, according to some aspects of the present disclosure.

FIG. 16 illustrates a block diagram of an example machine 1600 upon which any one or more of the techniques or methodologies discussed herein may be performed, according to some aspects of the present disclosure. In alternative aspects, the machine 1600 may operate as a standalone device or may be connected (e.g., networked) to other machines. In a networked deployment, the machine 1600 may operate in the capacity of a server machine, a client machine, or both in server-client network environments. In an example, the machine 1600 may act as a peer machine in peer-to-peer (P2P) (or other distributed) network environment. The machine 1600 may be a UE, eNodeB, AP, STA, personal computer (PC), a tablet PC, a set-top box (STB), a personal distal assistant (PDA), a mobile telephone, a smart phone, a web appliance, a network router, switch or bridge, or any machine capable of executing instructions (sequential or otherwise) that specify actions to betaken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing software as a service (SaaS), other computer cluster configurations.

Examples, as described herein, may include, or may operate on, logic or a number of components, circuitry, modules or mechanisms. Circuitry is a tangible entity (e.g., hardware) capable of performing specified operations and may be configured or arranged in a certain manner. In an example, circuits may be arranged (e.g., internally or with respect to external entities such as other circuits) in a specified manner, in some aspects as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "circuitry" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules or circuitry are temporarily configured, each of the modules or circuitry need not be instantiated at any one moment in time. For example, where the circuitry comprise a general-purpose hardware processor configured using software, the general-purpose hardware processor may be configured as respective different modules or different circuitry at different times. Software may accordingly configure a hardware processor, for example, to constitute a particular module at one instance of time and to constitute a different module at a different instance of time.

Machine (e.g., computer system) may include a hardware processor 1602 (e.g., a central processing unit (CPU), a graphics processing unit (GPU), a hardware processor core, or any combination thereof), a main memory 1604 and a static memory 1606, some or all of which may communicate with each other via an interlink (e.g., bus) 1608. The machine 1600 may further include a display unit 1610, an alphanumeric input device 1612 (e.g., a keyboard), and a user interface (UI) navigation device 1614 (e.g., a mouse). In an example, the display unit 1610, input device 1612 and UI navigation device 1614 may be a touch screen display. The machine 1600 may additionally include a storage device (e.g., drive unit) 1616, a signal generation device 1618 (e.g., a speaker), a network interface device 1620, and one or more sensors, such as a global positioning system (GPS) sensor, compass, accelerometer, or other sensor. The machine 1600 may include an output controller 1628, such as a serial (e.g., universal serial bus (USB), parallel, or other wired or wireless (e.g., infrared (IR), near field communication (NFC), and the like.) connection to communicate or control one or more peripheral devices (e.g., a printer, card reader, and the like).

The storage device 1616 may include a machine readable medium 1622 on which is stored one or more sets of data structures or instructions 1624 (e.g., software) embodying or utilized by any one or more of the techniques or functions described herein. The instructions 1624 may also reside, completely or at least partially, within the main memory 1604, within static memory 1606, or within the hardware processor 1602 during execution thereof by the machine. In an example, one or any combination of the hardware processor 1602, the main memory 1604, the static memory 1606, or the storage device 1616 may constitute machine readable media.

While the machine readable medium 1622 is illustrated as a single medium, the term "machine readable medium" may include a single medium or multiple media (e.g., a centralized or distributed database, and/or associated caches and servers) configured to store the one or more instructions 1624.

The term "machine readable medium" may include any medium that is capable of storing encoding or carrying instructions for execution by the machine and that cause the machine to perform any one or more of the techniques of the present disclosure, or that is cap able of storing encoding or carrying data structures used by or associated with such instructions. Non-limiting machine readable medium examples may include solid-state memories, and optical and magnetic media. Specific examples of machine readable media may include: nonvolatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1624 may further be transmitted or received over a communications network 1626 using a transmission medium via the network interface device 1620 utilizing any one of a number of transfer protocols (e.g., frame relay, internet protocol (IP), transmission control protocol (TCP), user datagram protocol (UDP), hypertext transfer protocol (HTTP), and the like). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1620 may include one or more physical jacks (e.g., Ethernet, coaxial, or phone jacks) or one or more antennas to connect to the communications network 1626. In an example, the network interface device 1620 may include a plurality of antennas to wirelessly communicate using at least one of single-input multiple-output (SIMO), multiple-input multiple-output (MIMO), or multiple-input single-output (MISO) techniques. In some examples, the network interface device 1620 may wirelessly communicate using Multiple User MIMO techniques. The term "transmission medium" shall be taken to include any intangible medium that is capable of storing encoding or carrying instructions for execution by the machine, and includes digital or analog communications signals or other intangible medium to facilitate communication of such software.

EXAMPLES

Example 1 is an apparatus for a User Equipment (UE), the apparatus comprising N transmit/receive (TX/RX) chains, each TX/RX chain comprising an RFFE, each RFFE comprising one or more thermal sensors configured to measure heat in the RFFE; an antenna array coupled to the plurality of TX/RX chains; and a codebook comprising a plurality of code words configured to respond to real-time heat measurements from the thermal sensors in each TX/RX chain to switch off selected TX/RX chains to reduce thermal density at the antenna array.

In Example 2, the subject matter of Example 1 optionally includes wherein the magnitude of the side lobe levels of the antenna array is reduced after the selected TX/RX chains are switched off.

In Example 3, the subject matter of any one or more of Examples 1-2 optionally include wherein a beamforming gin of the antenna array is substantially the same after the selected TX/RX chains are switched off as the antenna array beamforming gain before the selected TX/RX chains are switched off.

In Example 4, the subject matter of any one or more of Examples 1-3 optionally include dB less after the selected TX/RX chains are switched off than the antenna array beamforming gain before the selected TX/RX chains are switched off 4 is missing parent: 5. The apparatus of Example 1, wherein a communication channel received by the antenna array is substantially the same communication channel after the selected TX/RX chains are switched off as the communication channel before the selected TX/RX chains are switched off.

In Example 5, the subject matter of any one or more of Examples 1-4 optionally include wherein a channel state indicator (CSI) value received by receivers of the apparatus after the selected TX/RX chains are switched off is substantially the same CSI value received by the receivers of the apparatus before the selected TX/RX chains are switched off.

In Example 6, the subject matter of any one or more of Examples 1-5 optionally include wherein information comprising the real-time heat measurements is sent to a modem and used to switch off the selected TX/RX chains.

In Example 7, the subject matter of any one or more of Examples 1-6 optionally include (M).

Example 8 is an apparatus of an evolved Node B (eNB), the apparatus comprising N transmit/receive (TX/RX) chains, each TX/RX chain comprising an, each RFFE comprising one or more thermal sensors configured to measure heat in the RFFE; an antenna array coupled to the plurality of TX/RX chains; and a codebook comprising a plurality of code words configured to respond to real-time heat measurements from the thermal sensors in each TX/RX chain to switch off selected TX/RX chains to reduce thermal density at the antenna array.

In Example 9, the subject matter of Example 8 optionally includes wherein a magnitude of the side lobe levels of the antenna array is reduced after the selected TX/RX chains are switched off.

In Example 10, the subject matter of any one or more of Examples 8-9 optionally include wherein a beamforming gain of the antenna array is substantially the same after the selected TX/RX chains are switched off as the antenna array beamforming gin before the selected TX/RX chains are switched off.

In Example 11, the subject matter of any one or more of Examples 8-10 optionally include dB less after the selected TX/RX chains are switched off than the antenna array beamforming gin before the selected TX/RX chains are switched off.

In Example 12, the subject matter of any one or more of Examples 8-11 optionally include wherein a communication channel received by the antenna array is substantially the same communication channel after the selected TX/RX chains are switched off as the communication channel before the selected TX/RX chains are switched off.

In Example 13, the subject matter of any one or more of Examples 8-12 optionally include wherein a CSI value received by the receivers of the eNB after the selected TX/RX chains are switched off is substantially the same CSI value received by receivers of the eNB before the selected TX/RX chains are switched off.

In Example 14, the subject matter of any one or more of Examples 8-13 optionally include wherein information comprising the real-time heat measurements is sent to a modem and used to switch off the selected TX/RX chains.

In Example 15, the subject matter of any one or more of Examples 8-14 optionally include (M).

Example 16 is a method of designing a codebook to switch off selected TX/RX chains to reduce thermal density in a system comprising N TX/RX chains coupled to an antenna array, wherein each TX/RX chain comprises an RFFE, the method comprising selecting a number M of active TX/RX chains out of the N TX/RX chains, where the M TX/RX chains gives a desired system beamforming gin of 10 log 10(M), a desired system signal to noise ratio, and antenna pattern side lobe level reduction; and designing iterative code words for the codebook by the solution of two algorithms, Algorithm 1 represented by: Input: w(17 is missing parent: 0)=1N, M, d is a binary vector with preselected elements that are zero, iteration number K, Z={1, . . . , N}.

Example 17 is one or more computer-readable hardware storage device having embedded therein a set of instructions which, when executed by one or more processors that control N TX/RX chains, each TX/RX chain comprising an RFFE coupled to an antenna array, each RFFE comprising one or more thermal sensors configured to measure heat in the RFFE. the operations comprising monitoring real-time heat measurements by the one or more thermal sensors in each RFFE; and switching off a predetermined number of the N TX/RX chains by use of a codebook that comprises a plurality of code words that are configured for iterative execution by responding to the monitored real-time heat measurements in each TX/RX chain to reduce thermal density at an antenna array coupled to the N TX/RX chains.

In Example 18, the subject matter of Example 17 optionally includes wherein the magnitude of the side lobe levels of the antenna array is reduced after the selected TX/RX chains are switched off.

In Example 19, the subject matter of any one or more of Examples 17-18 optionally include wherein the antenna array beamforming gain is substantially the same after the selected TX/RX chains are switched off as the antenna array beamforming gin before the selected TX/RX chains are switched off.

In Example 20, the subject matter of any one or more of Examples 17-19 optionally include dB less after the selected TX/RX chains are switched off than the antenna array beamforming gain before the selected TX/RX chains are switched off.

In Example 21, the subject matter of any one or more of Examples 17-20 optionally include wherein the communication channel received by the antenna array is substantially the same communication channel after the selected TX/RX chains are switched off as the communication channel before the selected TX/RX chains are switched off.

In Example 22, the subject matter of any one or more of Examples 17-21 optionally include wherein a CSI value received by the receivers of the apparatus after the selected TX/RX chains are switched off is substantially the same CSI value as the CSI value received by the receivers of the apparatus before the selected TX/RX chains are switched off.

In Example 23, the subject matter of any one or more of Examples 17-22 optionally include wherein information comprising the real-time heat measurements is sent to a modem and used to switch off the selected TX/RX chains.

In Example 24, the subject matter of any one or more of Examples 17-23 optionally include wherein the code words are configured to switch off the selected TX/RX chains while maintaining M RFFEs switched on, where M<N and the desired beamforming gin is 10 log 10(M).

In Example 25, the subject matter can include, or can optionally be combined with any portion or combination of, any portions of any one or more of Examples 1 through 24 to include, subject matter that can include means for performing any one or more of the functions of Examples 1 through 24, or a machine-readable medium including instructions that, when performed by a machine, cause the machine to perform any one or more of the functions of Examples 1 through 24.

The above detailed description includes references to the accompanying drawings, which form a part of the detailed description. The drawings show, by way of illustration, specific aspects in which the disclosed subject matter can be practiced. These aspects are also referred to herein as "examples." In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect. The scope of the disclosed subject matter should be determined with reference to the appended claims, along with the full scope of equivalents to which such claims are entitled.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate aspect.

The invention claimed is:

1. An apparatus comprising:
 a baseband modem configured to cause a user equipment (UE) to:
  receive real-time temperature measurements from a plurality of radio frequency (RF) front ends (RFFEs) of corresponding transmit/receive (TX/RX) chains coupled to an antenna array, wherein the real-time temperature measurements are representative of a respective temperature of each RFFE;

identify a hot spatial region in the antenna array, based on the real-time temperature measurements; and select and apply a plurality of code words from a codebook, based on the real-time temperature measurements, to control power of the plurality of TX/RX chains, in order to reduce thermal density in the hot spatial region.

2. The apparatus of claim 1, wherein the plurality of code words are generated using a method that minimizes a maximum of a pattern of the antenna array over one or more side lobes.

3. The apparatus of claim 2, wherein the method includes weighted convex relaxation of a binary 1-infinity norm minimization.

4. The apparatus of claim 1, wherein the baseband modem is configured to switch off selected TX/RX chains of the plurality of TX/RX chains through applying the plurality of code words.

5. The apparatus of claim 1, wherein the codebook is generated such that each RFFE is turned off at least once when the plurality of code words is applied.

6. The apparatus of claim 1, wherein the baseband modem is configured to apply the plurality of code words in a cyclic fashion.

7. The apparatus of claim 1, wherein the plurality of code words is generated to provide a stable beam pattern and have, in aggregate, a desired duty cycle of operation within the hot spatial region, wherein each of the plurality of codewords has a different set of elements idle or operating at a lower transmit power.

8. A user equipment device (UE) comprising:
an antenna array;
a plurality of transmit/receive (TX/RX) chains coupled to the antenna array, each TX/RX chain of the plurality of transmit chains comprising a corresponding radio frequency (RF) front end (RFFE), each RFFE comprising one or more thermal sensors configured to measure temperature in the RFFE; and
a baseband modem configured to:
identify a hot spatial region in the antenna array, based on real-time temperature measurements from the one or more thermal sensors of each RFFE; and
select and apply a plurality of code words from a codebook, based on the real-time temperature measurements, to control power of the plurality of TX/RX chains, in order to reduce thermal density in the hot spatial region.

9. The UE of claim 8, wherein the plurality of TX/RX chains includes a plurality of receivers, wherein a channel state indicator (CSI) value received by the plurality of receivers prior to the plurality of code words being applied is a same CSI value that is received by the plurality of receivers while the plurality of code words are being applied.

10. The UE of claim 8, wherein the plurality of code words are generated using a method that minimizes a maximum of a pattern of the antenna array over one or more side lobes.

11. The UE of claim 8, wherein the baseband modem is configured to switch off selected TX/RX chains of the plurality of TX/RX chains through applying the plurality of code words.

12. The UE of claim 8, wherein the plurality of TX/RX chains and the antenna array are configured transmit and receive in a millimeter-wave frequency range.

13. The UE of claim 8, wherein each RFFE includes two or more thermal sensors.

14. The UE of claim 8, wherein none of the plurality of TX/RX chains includes a heat sink.

15. A non-transitory memory medium storing program instructions for execution by one or more processors that control a plurality of TX/RX chains coupled to an antenna array, wherein the program instructions, when executed by the one or more processors, cause the one or more processors to perform operations comprising:
monitoring real-time temperature measurements in each RFFE;
identifying a hot spatial region in an antenna array, based on the real-time temperature measurements; and
selecting and applying a plurality of code words from a codebook, based on the real-time temperature measurements, to control power of the plurality of TX/RX chains in order to reduce thermal density in the hot spatial region.

16. The non-transitory memory medium of claim 15, wherein the plurality of code words are generated using a method that minimizes a maximum of a pattern of the antenna array over one or more side lobes.

17. The non-transitory memory medium of claim 15, wherein a beamforming gain of the antenna array is no more than 1 dB less after the plurality of code words have been applied than the beamforming gain of the antenna array before the plurality of code words have been applied.

18. The non-transitory memory medium of claim 15, wherein the plurality of TX/RX chains includes a plurality of receivers, wherein a channel state indicator (CSI) value received by the plurality of receivers prior to the plurality of code words being applied is a same CSI value that is received by the plurality of receivers while the plurality of code words are being applied.

19. The non-transitory memory medium of claim 15, wherein the plurality of code words is generated to provide a stable beam pattern and have, in aggregate, a desired duty cycle of operation within the hot spatial region, wherein each of the plurality of codewords has a different set of elements idle or operating at a lower transmit power.

20. The non-transitory memory medium of claim 15, the operations further comprising:
applying the plurality of code words in a cyclic fashion.

* * * * *